United States Patent
Wong et al.

(10) Patent No.: US 11,375,395 B2
(45) Date of Patent: Jun. 28, 2022

(54) CENTRALIZED RADIO RESOURCE MANAGEMENT (RRM) OF A WIRELESS MESH NETWORK

(71) Applicant: Amazon Technologies, Inc., Seattle, WA (US)

(72) Inventors: Chiu Ngok Eric Wong, San Jose, CA (US); Kun Ting Tsai, Fremont, CA (US); Xueheng Hu, San Jose, CA (US); Jian Lu, Los Gatos, CA (US); Armando J. Lucrecio, Milpitas, CA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 16/436,193

(22) Filed: Jun. 10, 2019

(65) Prior Publication Data
US 2020/0389808 A1 Dec. 10, 2020

(51) Int. Cl.
*H04W 28/02* (2009.01)
*H04B 17/318* (2015.01)
*H04W 72/04* (2009.01)
*H04W 84/18* (2009.01)

(52) U.S. Cl.
CPC ........ *H04W 28/021* (2013.01); *H04B 17/318* (2015.01); *H04W 28/0236* (2013.01); *H04W 72/048* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 5,274,838 A | * | 12/1993 | Childress | H04L 1/1614 455/507 |
| 6,714,789 B1 | * | 3/2004 | Oh | H04W 36/32 455/422.1 |
| 2005/0208949 A1 | | 9/2005 | Chiueh | |
| 2006/0072502 A1 | * | 4/2006 | Crandall | H04W 72/02 370/329 |
| 2008/0069047 A1 | * | 3/2008 | Yee | H04W 76/14 370/331 |

(Continued)

FOREIGN PATENT DOCUMENTS

WO WO-2018229312 A1 * 12/2018 ............ H04W 16/10

OTHER PUBLICATIONS

International Search Report and Written Opinion on application No. PCT/US2020/036166, dated Sep. 9, 2020.

*Primary Examiner* — Noel R Beharry
*Assistant Examiner* — Rodrick Mak
(74) *Attorney, Agent, or Firm* — Lowenstein Sandler LLP

(57) ABSTRACT

Network hardware devices organized in a wireless network. A controller device receives device information about each of a multiple network devices, network congestion at each device, scan data, and a station list from each of the devices. The controller device assigns a channel to each radio of the multiple network devices using the device information, the network congestion data, the scan data, and the station list and outputs a first subset of channel assignments to a first group of the network devices, a second subset of channel assignments to a second group of the network devices, and a third subset of channel assignments to a third group of the network devices.

20 Claims, 17 Drawing Sheets

(56) References Cited

U.S. PATENT DOCUMENTS

| | | | |
|---|---|---|---|
| 2008/0107071 A1* | 5/2008 | Tsigler | H04W 16/10 370/329 |
| 2009/0080381 A1* | 3/2009 | Yashar | H04W 48/20 370/331 |
| 2009/0109855 A1 | 4/2009 | Gong et al. | |
| 2010/0302945 A1* | 12/2010 | Leppanen | G06Q 30/0259 370/235 |
| 2011/0238242 A1* | 9/2011 | Nichter | B61L 27/0005 701/19 |
| 2014/0036845 A1* | 2/2014 | Liu | H04W 72/082 370/329 |
| 2015/0050884 A1* | 2/2015 | Phang | H04W 40/12 455/41.2 |
| 2015/0208426 A1* | 7/2015 | Jetcheva | H04W 72/082 370/254 |
| 2019/0243836 A1* | 8/2019 | Nanda | G06F 16/258 |

\* cited by examiner

CENTRALIZED RADIO RESOURCE MANAGEMENT (RRM) OF A WIRELESS MESH NETWORK

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
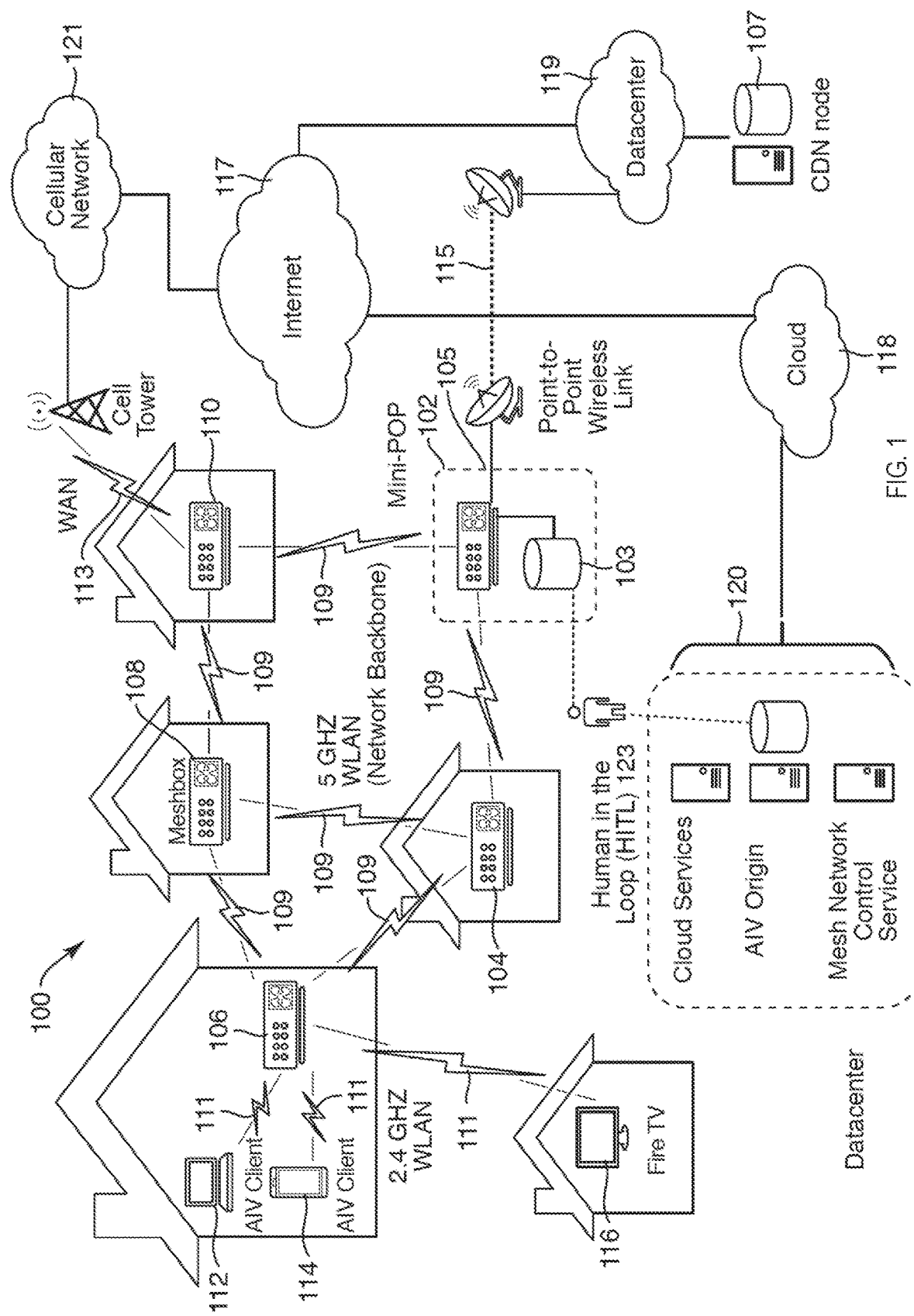
FIG. 1 is a network diagram of network hardware devices organized in a wireless mesh network (WMN) for content distribution to client devices in an environment of limited connectivity to broadband Internet infrastructure according to one embodiment.

Technologies directed to a centralized radio resource management (RRM) architecture of a wireless mesh network are described. Content delivery networks (CDNs) (also referred to as content delivery platforms) can be used for serving convent (e.g., video on demand (VOD)) and Internet services to residential customers. In some cases, the content delivery platforms can be deployed in environments with less internet infrastructure, such as in India. One of the content delivery platforms can be based on wireless local area network (WLAN) technologies. WLAN connectivity operating in unlicensed spectrum offers a cost-effective and scalable solution for a wireless wide area network (WWAN) to be deployed over a large densely populated region. There are, however, a number of design challenges that comes with WLAN-based CDNs, including bandwidth and channel allocation, managing interference (adjacent channel interference (ACI) and co-channel interference (CCI), managing transmit power, tuning carrier sense multiple access (CSMA) parameters, and managing Enhanced distributed channel access (EDCA) parameters.

Aspects of the present disclosure address the above and other deficiencies by providing a centralized RRM architecture that provide data management and monitoring of a wireless mesh network, data analysis, and visualization of the wireless mesh network, and staging and real-time radio resource management of radios within the wireless mesh network. In particular, the centralized RRM architecture can provide functionality, including real-time or near real-time centralized channel assignment functionality, using time-series databases to calculate an optimal allocation of a desired set of network parameters (e.g., channels). The centralized RRM architecture can also provide visualization to graph and monitor current network conditions of the wireless mesh network.

In general, a wireless mesh network (WMN), containing multiple mesh network devices organized in a mesh topology, is described. The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. One system of devices organized in a WMN includes a first network hardware device having at least one of a point-to-point wireless link to access content files over the Internet or a wired connection to access the content files stored on a storage device coupled to the first network hardware device. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to the MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like. In other embodiments, the wireless network is a wireless network of multiple network devices, such as multiple access points of an access network.

The embodiments of the mesh network devices may be used to deliver content, such as video, music, literature, or the like, to users who do not have access to broadband Internet connections because the mesh network devices may be deployed in an environment of limited connectivity to broadband Internet infrastructure. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices are capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. In some embodiments, the mesh network architecture includes a large number of mesh nodes, called Meshbox nodes. From a hardware perspective, the Meshbox node functions much like an enterprise-class router with the added capability of supporting P2P connections to form a network backbone of the WMN. From a software perspective, the Meshbox nodes provide much of the capability of a standard CDN, but in a localized manner. The WMN can be deployed in a geographical area in which broadband Internet is limited. The WMN can scale to support a geographic area based on the number of mesh network devices, and the corresponding distances for successful communications over WLAN channels by those mesh network devices.

Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. Alternatively, the embodiments described herein can be utilized for providing web services. The embodiments described herein are compatible with existing content delivery technologies, and may leverage architectural solutions, such as CDN services like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in environments where there is limited broadband Internet infrastructure. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIGS. 1-4 are generally directed to network hardware devices, organized in a wireless mesh network, for content distribution to client consumption devices in environments of limited connectivity to broadband internet infrastructure. The embodiments described herein may be deployed in these wireless mesh networks using any of the devices described in FIGS. 1-4. FIG. 5-13 are generally directed to the centralized RRM architecture of a wireless mesh network. In one embodiment, a controller device receives device information about each of a multiple mesh network devices, network congestion at each device, scan data, and a station list from each of the devices. The device information can include a MAC address of the device, a list of available radios, a current channel assignment for each of the radios, or the like. The scan data can include a list of other radios of other devices that the respective device has detected during scans of neighboring devices. The controller device assigns a channel to each radio of the multiple mesh network devices using the device information, the network congestion data, the scan data, and the station list and outputs a first subset of channel assignments to a first group of the mesh network devices, a second subset of channel assignments to a second group of the mesh network devices, and a third subset of channel assignments to a third group of the mesh network devices. The controller device can be a server that receives the data as reports from each of the devices in the wireless mesh network. The controller device can also be one of the devices in the wireless mesh network.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP). The CDN device 107 may be a POP device (also referred to as a POP device), an edge server, a content server device, or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The network hardware devices 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include cloud services to control setup of the mesh nodes, the content delivery service (e.g., AIV origin), as well as other cloud services. The mesh network control service can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, when line of sight is required for the directional microwave link, terrain or building may be constraints on the line of sight. In another embodiment, the mini-POP device 102 can operate with a human in the loop (HITL) to update the cache contents. HITL implies that a person will be tasked with manually swapping out the hard drives with hard drives with the updated content or adding the content to the hard drive. This solution may be a relatively high bandwidth but extremely high latency solution and may only be suitable if the use cases allow longer times (e.g., hours) to service a cache miss.

The WMN 100 may be considered a multi-radio multi-channel (MRMC) mesh network. MRMC mesh networks are an evolution of traditional single radio WMNs and a leading contender for combatting the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
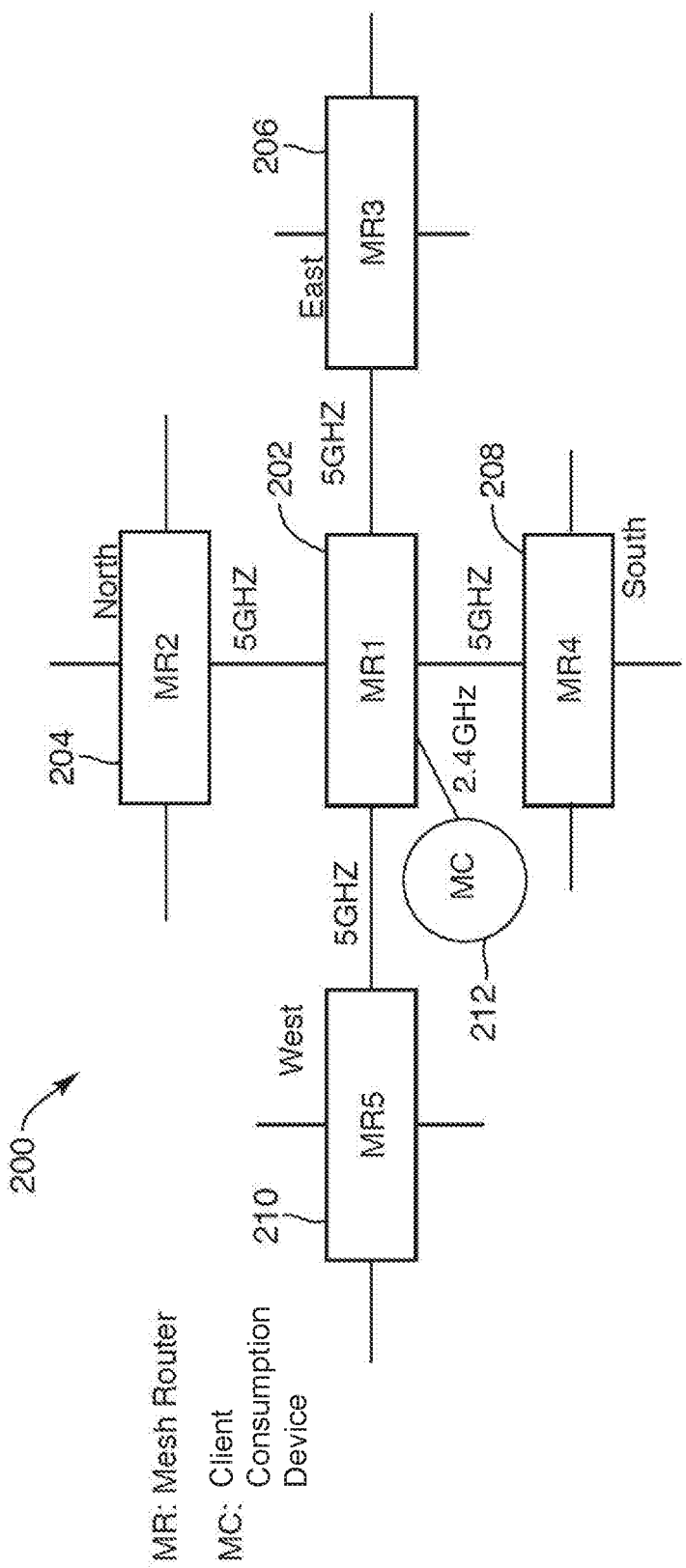
FIG. 2 is a block diagram of a network hardware device with five radios operating concurrently in a WMN according to one embodiment.

FIG. 2 is a block diagram of a network hardware device 202 with five radios operating concurrently in a wireless mesh network 200 according to one embodiment. The wireless mesh network 200 includes multiple network hardware devices 202-210. The network hardware device 202 may be considered a mesh router that includes four 5 GHz radios for the network backbone for multiple connections with other mesh routers, i.e., network hardware devices 204-210. For example, the network hardware device 204 may be located to the north of the network hardware device 202 and connected over a first 5 GHz connection. The network hardware device 206 may be located to the east of the network hardware device 202 and connected over a second 5 GHz connection. The network hardware device 208 may be located to the south of the network hardware device 202 and connected over a third 5 GHz connection. The network hardware device 210 may be located to the west of the network hardware device 202 and connected over a fourth 5 GHz connection. In other embodiments, additional network hardware devices can be connected to other 5 GHz connections of the network hardware device 202. It should also be noted that the network hardware devices 204-210 may also connect to other network hardware devices using its respective radios. It should also be noted that the locations of the network hardware devices 20-210 can be in other locations than north, south, east, and west. For example, the network hardware devices can be located above or below the mesh network device 202, such as on another floor of a building or house.

The network hardware device 202 also includes at least one 2.4 GHz connection to serve client consumption devices, such as the client consumption device 212 connected to the network hardware device 202. The network hardware device 202 may operate as a mesh router that has five radios operating concurrently or simultaneously to transfer mesh network traffic, as well as service connected client consumption devices. This may require that the 5GLL and 5GLH to be operating simultaneously and the 5GHL and 5GHH to be operating simultaneously, as described in more detail below. It should be noted that although the depicted embodiment illustrates and describes five mesh nodes, in other embodiments, more than five mesh nodes may be used in the WMN. It should be noted that FIG. 2 is a simplification of neighboring mesh network devices for a given mesh network device. The deployment of forty or more mesh network device may actually be located at various directions than simply north, south, east, and west as illustrated in FIG. 2. Also, it should be noted that here are a limited number of communication channels available to communicate with neighboring mesh nodes in the particular wireless technology, such as the Wi-Fi® 5 GHz band. The embodiments of the mesh network devices, such as the directional antennas, can help with isolation between neighboring antennas that cannot be separated physically given the limited size the mesh network device.

Figure 3:
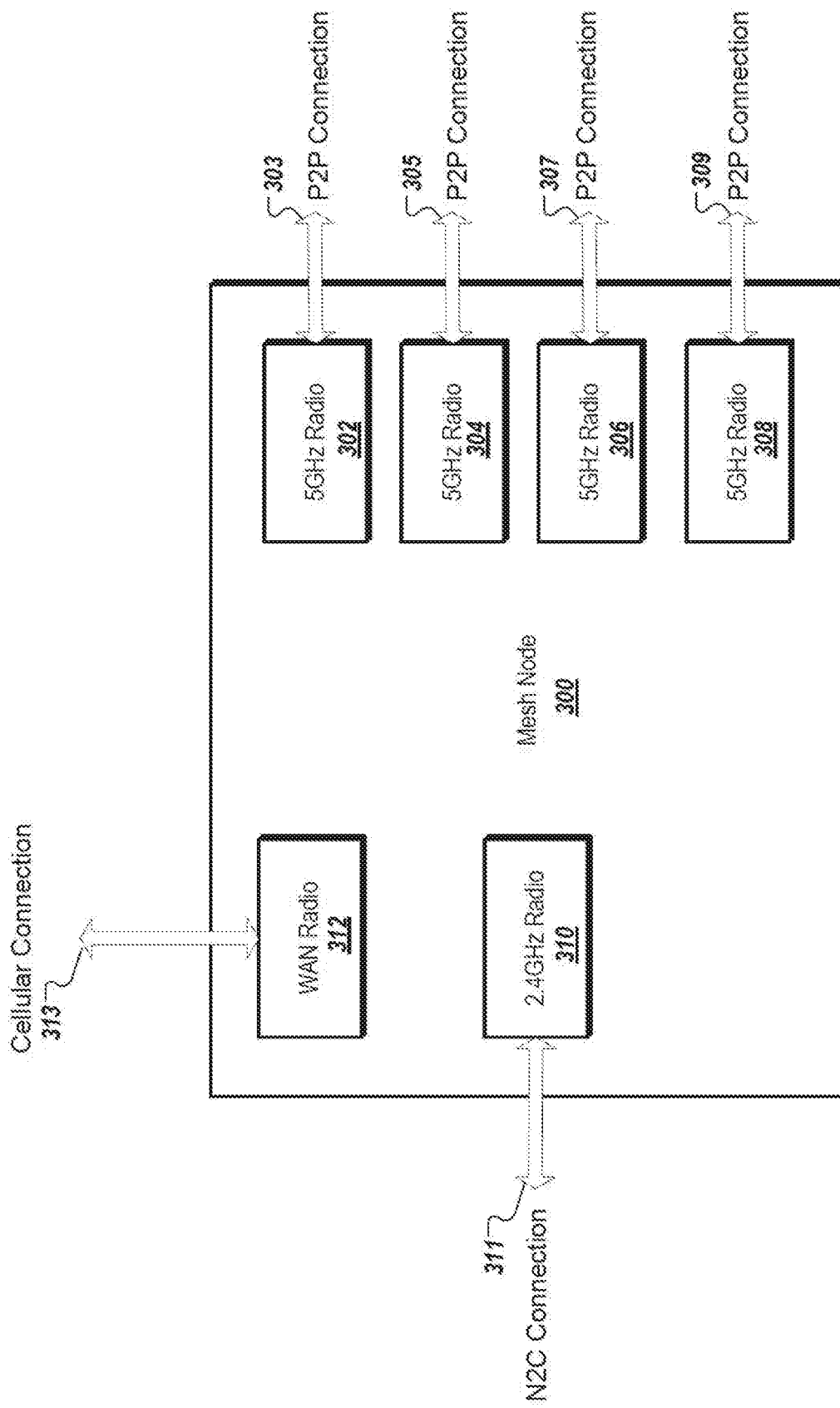
FIG. 3 is a block diagram of a mesh node with multiple radios according to one embodiment.

FIG. 3 is a block diagram of a mesh node 300 with multiple radios according to one embodiment. The mesh node 300 includes a first 5 GHz radio 302, a second 5 GHz radio 304, a third 5 GHz radio 306, a fourth 5 GHz radio 308, a 2.4 GHz radio 310, and a cellular radio 312. The first 5 GHz radio 302 creates a first P2P wireless connection 303 between the mesh node 300 and another mesh node (not illustrated) in a WMN. The second 5 GHz radio 304 creates a second P2P wireless connection 305 between the mesh node 300 and another mesh node (not illustrated) in the WMN. The third 5 GHz radio 306 creates a third P2P wireless connection 307 between the mesh node 300 and another mesh node (not illustrated) in the WMN. The fourth 5 GHz radio 308 creates a fourth P2P wireless connection 309 between the mesh node 300 and another mesh node (not illustrated) in the WMN. The 2.4 GHz radio 310 creates a N2C wireless connection 311 between the mesh node 300 and a client consumption device (not illustrated) in the WMN. The cellular radio 312 creates a cellular connection between the mesh node 300 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In another embodiment, a system of devices can be organized in a WMN. The system may include a single ingress node for ingress of content files into the wireless mesh network. In one embodiment, the single ingress node is a mini-POP node that has attached storage device(s). The single ingress node may optionally include a point-to-point wireless connection, such as a microwave communication channel to a node of the CDN. The single ingress node may include a point-to-point wireless link to the Internet (e.g., a server device of the CDN) to access content files over the Internet. Alternatively to, or in addition to the point-to-point wireless link, the single ingress node may include a wired connection to a storage device to access the content files stored on the storage device. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to the MNCS by cellular connections. Each network hardware device includes a cellular connection to a MNCS service hosted by a cloud computing system. The cellular connections may have lower bandwidths than the point-to-point wireless link.

The system includes a first network hardware device wirelessly connected to a first client consumption device by a first node-to-client (N2C) wireless connection and a second network hardware device wirelessly connected to the single ingress node. The first network hardware device can wirelessly connect to a first client consumption device over a first N2C connection. The N2C wireless connection may be one of a second set of one or more WLAN connections that operate at a second frequency of approximately 2.4 GHz. During operation, the first network hardware device may receive a first request for a first content file from the first client consumption device over the first N2C connection. The first network device sends a second request for the first content file to the second network hardware device through the network backbone via a first set of zero or more intervening network hardware devices between the first network hardware device and the second network hardware device. The first network device receives the first content file from the first network hardware device through the network backbone via the first set of zero or more intervening network hardware devices and sends the first content file to the first client consumption device over the first N2C connection. In a further embodiment, the first network hardware device includes another radio to wirelessly connect to a MNCS device by a cellular connection to exchange control data.

In a further embodiment, the first network hardware device is further to receive a third request for a second content file from a second client consumption device connected to the first network hardware device over a second N2C connection between the first network hardware device and the second client consumption device. The first network hardware device sends a fourth request for the second content file stored at a third network hardware device through the network backbone via a second set of zero or more intervening network hardware devices between the first network hardware device and the third network hardware device. The first network hardware device receives the second content file from the third network hardware device through the network backbone via the second set of zero or more intervening network hardware devices. The first network hardware device sends the second content file to the second client consumption device over the second N2C connection.

In one embodiment, the zero or more intervening network hardware devices of the first set are not the same as the zero or more intervening network hardware devices of the second set. In some embodiments, a path between the first network hardware device and the second network hardware device could include zero or more hops of intervening network hardware devices. In some cases, the path may include up to 12-15 hops within a mesh network of 100×100 network hardware devices deployed in the WMN.

In a further embodiment, the first network hardware device receives the fourth request for the second content file from a fourth network hardware device through the network backbone via a third set of zero or more intervening network hardware devices between the first network hardware device and the fourth network hardware device. The first network hardware device sends the second content file to the fourth network hardware device through the network backbone via the third set of zero or more intervening network hardware devices.

In some embodiments, the first network hardware device determines whether the first content file is stored in memory of the first network hardware device. The memory of the first network hardware device may be volatile memory, non-volatile memory, or a combination of both. When the first content file is not stored in the memory or the storage of the first network hardware device, the first network hardware device generates and sends the second request to a first network hardware device of the first set. Intervening network hardware devices can make similar determinations to locate the first content file in the WMN. In the event that the first content file is not stored in the second network hardware device or any intervening nodes, the second network hardware device can request the first content file from the mini-POP node, as described herein. When the mini-POP node does not store the first content file, the mini-POP can take action to obtain the first content file, such as requesting the first content file from a CDN over a point-to-point link. Alternatively, the human in the loop process can be initiated as described herein.

In a further embodiment, the second network hardware device receives the second request for the first content file and retrieves the first content file from the single ingress node when the first content file is not previously stored at the second network hardware device. The second network hardware device sends a response to the second request with the first content file retrieved from the single ingress node. The second network hardware device may store a copy of the first content file in memory or in persistent storage of the second network hardware device for a time period.

In another embodiment, the single ingress node receives a request for a content file from one of the multiple network hardware devices over a P2P wireless connection. The request originates from a requesting consumption device. It should be noted that a video client can be installed on the client consumption device, on the network hardware device, or both. The single ingress node determines whether the content file is stored in a storage device coupled to the single ingress node. The single ingress node generates and sends a first notification to the requesting one of the network hardware devices over the P2P wireless connection when the content file is not stored in the storage device. The first notification includes information to indicate an estimated delay for the content file to be available for delivery. The single ingress node generates and sends a second notification to an operator of the first network hardware device. The second notification includes information to indicate that the content file has been requested by the requesting client consumption device. In this embodiment, the notifications can be pushed to the appropriate recipients. In another embodiment, an operator can request which content files had been requested in the WMN and not serviced. This can initiate the ingress of the content file into the WMN, even if with a longer delay.

In some embodiments, the mini-POP node is coupled to a storage device to store the content files as original content files for the wireless mesh network. A point-to-point wireless link may be established between the mini-POP node and a node of a CDN. In another embodiment, the mini-POP node is coupled to a node of a content delivery network (CDN) via a microwave communication channel.

In a further embodiment, the second network hardware device can wirelessly connect to a third network hardware device over a second P2P connection. During operation, the third network hardware device may receive a third request for a second content file from a second client consumption device over a second N2C connection between the third network hardware device and the second client consumption device. The third network hardware device sends a fourth request for the second content file to the second network hardware device over the second P2P connection. The third network hardware device receives the second content file from the second network hardware device over the second P2P connection and sends the second content file to the second client consumption device over the second N2C connection.

In another embodiment, the first network hardware device receives the fourth request for the second content file from the third network hardware device. The second network hardware device determines whether the second content file is stored in memory of the second network hardware device. The second network hardware device sends a fifth request to the first network hardware device over the first P2P connection and receives the second content file over the first P2P connection from the first network hardware device when the second content file is not stored in the memory of the second network hardware device. The second network hardware device sends the second content file to the third network hardware device over the second P2P connection.

In another embodiment, the second network hardware device may wirelessly connect to a third network hardware device over a second P2P connection. During operation, the third network hardware device may receive a third request for the first content file from a second client consumption device over a second N2C connection between the third network hardware device and the second client consumption device. The third network hardware device sends a fourth request for the first content file to the second network hardware device over the second P2P connection. The third network hardware device receives the first content file from the first network hardware device over the second P2P connection and sends the first content file to the second client consumption device over the second N2C connection.

In another embodiment, the first network hardware device receives a request for a content file from one of the network hardware devices over one of the P2P wireless connections. The request is from a requesting client consumption device connected to one of the multiple network hardware devices. The first network hardware device determines whether the content file is stored in the storage device. The first network hardware device generates and sends a first notification to the one of the network hardware devices over the one of the P2P wireless connections when the content file is not stored in the storage device. The first notification may include information to indicate an estimated delay for the content file to be available for delivery. The first network hardware device generates and sends a second notification to an operator of the first network hardware device. The second notification may include information to indicate that the content file has been requested by the requesting client consumption device.

In a further embodiment, the P2P wireless connections are WLAN connections that operate in a first frequency range and the N2C connections are WLAN connections that operate in a second frequency range. In another embodiment, the P2P wireless connections operate at a first frequency of approximately 5.0 GHz and the N2C connections operate at a second frequency of approximately 2.4 GHz.

In some embodiments, at least one of the network hardware devices is a mini-POP node and a point-to-point wireless link is established between the mini-POP node and a POP node of an ISP. In one embodiment, the point-to-point wireless link is a microwave link (e.g., directional microwave link) between the mini-POP node and the node of the CDN. In another embodiment, the mini-POP node stores an index of the content files store in attached storage devices.

In some embodiments, a mesh network architecture includes multiple mesh nodes organized in a self-contained mesh network. The self-contained mesh network may be self-contained in the sense that content resides in, travels through, and is consumed by nodes in the mesh network without requiring the content to be fetched outside of the mesh network. Each of the mesh nodes includes a first radio for inter-node communications with the other nodes on multiple P2P channels, a second radio for communications with client consumption devices on N2C channels. The mesh network architecture also includes a mini-POP node including a radio for inter-connection communications with at least one of the mesh nodes on a P2P channel. The mesh network architecture also includes a storage device coupled to the mini-POP, the storage device to store content files for distribution to a requesting client consumption device. The mini-POP node may be a single ingress point for content files for the self-contained mesh network. The storage devices of the mini-POP node may be internal drives, external drives, or both. During operation, a first node of the mesh nodes includes a first radio to wirelessly connect to a requesting client consumption device via a first N2C channel to receive a first request for a content file directly from the requesting client consumption device via a first N2C channel between the first node and the requesting client consumption device 1. A second radio of the first node sends a second request for the content file to a second node via a first set of zero or more intervening nodes between the first node and the second node to locate the content file within the self-contained mesh network. The second radio receives the content file from the second node in response to the request. The first radio sends the content file to the requesting client consumption device via the first N2C channel. The first node determines a location of the content file within the self-contained mesh network and sends a second request for the content file via a second P2P channel to at least one of the mini-POP or a second node, the second request to initiate delivery of the content file to the requesting client consumption device over a second path between the location of the content file and the requesting client consumption device.

In another embodiment, the first node stores a copy of the content file in a storage device at the first node. The first node receives a third request for the content file directly from a second client consumption device via a second N2C channel between the first node and the second client consumption device. The first node sends the copy of the content file to the second client consumption device via the second N2C channel in response to the third request.

In a further embodiment, the first node receives the content file via the second P2P channel in response to the second request and sends the content file to the requesting client consumption device via the first N2C channel or the first P2P channel in response to the first request. In some embodiments, the second path and the first path are the same.

In a further embodiment, the first node includes a third radio to communicate control data over a cellular connection between the first node and the MNSC.

In another embodiment, a system includes a POP node having access to content files via at least one of data storage devices coupled to the POP node or a first point-to-point connection to a first device of an ISP. The system also includes multiple mesh nodes, organized in a WMN, and at least one of the mesh nodes is wirelessly coupled to the POP node. The WMN is a mesh topology in which the multiple mesh nodes cooperate in distribution of the content files to client consumption devices that do not have access to reliable access to the server device of the CDN or in an environment of limited connectivity to broadband infrastructure. A first node of the multiple mesh nodes is a multi-radio, multi-channel (MRMC) device that includes multiple P2P connections to form parts of a network backbone in which the first node wireless connects to other mesh nodes via a first set of WLAN channels reserved for inter-node communication. The first node also includes one or more N2C connections to wireless connect to one or more of the client consumption devices connected to the WMN via a second set of WLAN channels reserved for serving the content files to the client consumption devices. The first node may also include a cellular connection to wireless connect to a second device of the CDN. The second device may be part of a cloud computing system and may host a mesh network control service as described herein. It should be noted that the first point-to-point connection is higher bandwidth than the cellular connection.

Figure 4:
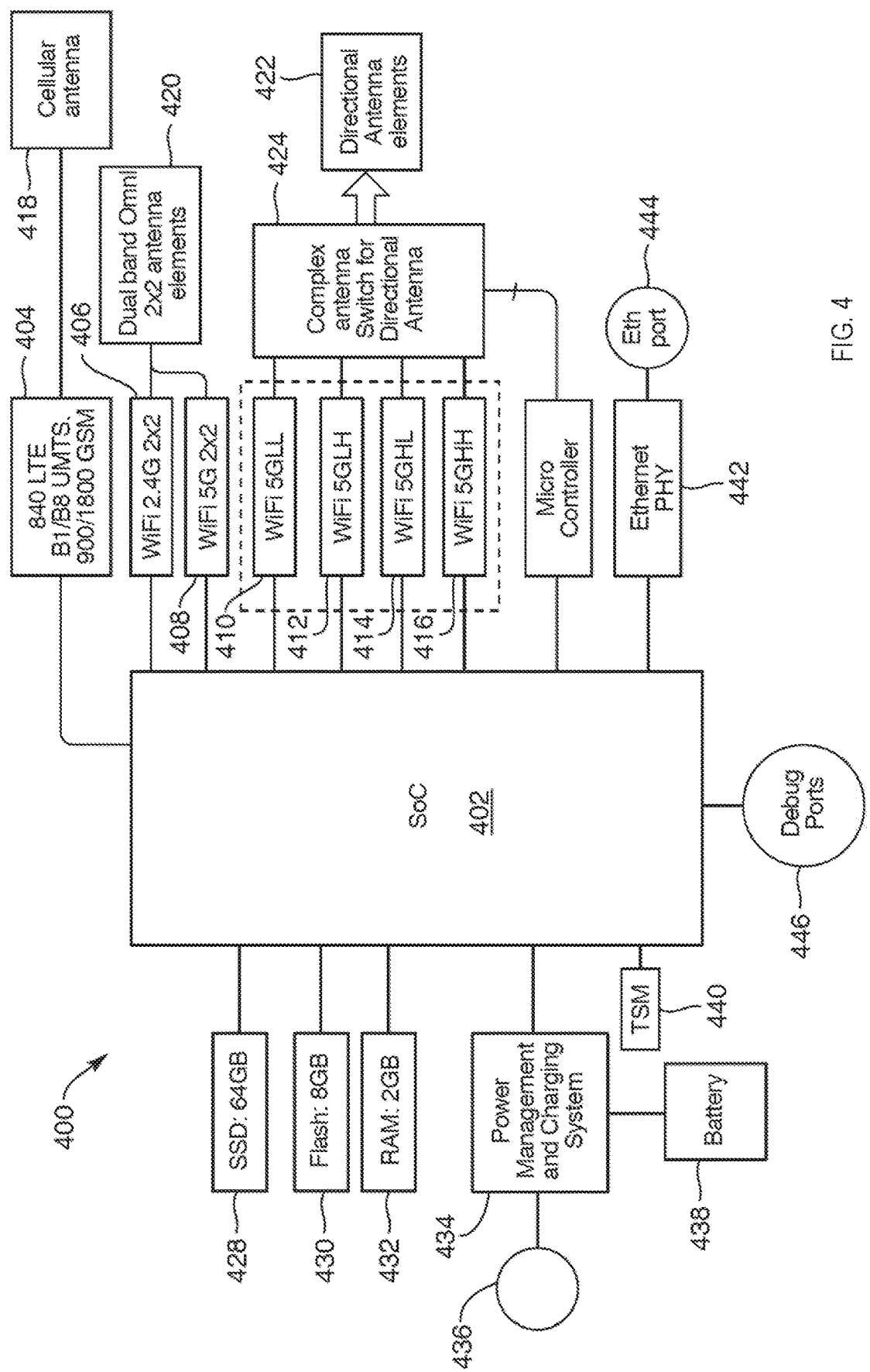
FIG. 4 is a block diagram of a mesh network device according to one embodiment.

FIG. 4 is a block diagram of a mesh network device 400 according to one embodiment. The mesh network device 400 may be one of many mesh network devices organized in a WMN (e.g., WMN 100). The mesh network device 400 is one of the nodes in a mesh topology in which the mesh network device 400 cooperates with other mesh network devices in distribution of content files to client consumption devices in an environment of limited connectivity to broadband Internet infrastructure, as described herein. The mesh network device 400 may be the mini-POP node 102 of FIG. 1. Alternatively, the mesh network device 400 may be any one of the mesh network devices 104-110 of FIG. 1. In another embodiment, the mesh network device 400 is any one of the network hardware devices 202-210 of FIG. 2. In another embodiment, the mesh network device 400 is the mesh node 300 of FIG. 3.

The mesh network device 400 includes a system on chip (SoC) 402 to process data signals in connection with communicating with other mesh network devices and client consumption devices in the WMN. The SoC 402 includes a processing element (e.g., a processor core, a central processing unit, or multiple cores) that processes the data signals and controls the radios to communicate with other devices in the WMN. In one embodiment, the SoC 402 is a dual core SoC, such as the ARM A15 1.5 GHz with hardware network acceleration. The SoC 402 may include memory and storage, such as 2 GB DDR RAM and 64 GB eMMC coupled to the SoC 402 via external HDD interfaces (e.g., SATA, USB3, or the like). The SoC 402 may include multiple RF interfaces, such as a first interface to the first RF module 404 (e.g., HSCI interface for cellular module (3G)), a second interface to the WLAN 2.4 GHz radio 406, a third interface to the WLAN 2.4 GHz radio 408, and multiple interfaces to the WLAN 5 GHz radios, such as on a PCIe bus. In one embodiment, the SoC 402 is the IPQ8064 Qualcomm SoC or the IPQ4029 Qualcomm SoC. Alternatively, other types of SoCs may be used, such as the Annapurna SoC, or the like. Alternatively, the mesh network device 400 may include an application processor that is not necessarily considered to be a SoC.

The mesh network device 400 may also include memory and storage. For example, the mesh network device 400 may include SSD 64 GB 428, 8 GB Flash 430, and 2 GB 432. The memory and storage may be coupled to the SoC 402 via one or more interfaces, such as USB 3.0, SATA, or SD interfaces. The mesh network device 400 may also include a single Ethernet port 444 that is an ingress port for Internet Protocol (IP) connection. The Ethernet port 444 is connected to the Ethernet PHY 442, which is connected to the SoC 402. The Ethernet port 444 can be used to service the mesh network device 400. Although the Ethernet port 444 could provide wired connections to client devices, the primary purpose of the Ethernet port 444 is not to connect to client devices, since the 2.4 GHz connections are used to connect to clients in the WMN. The mesh network device 400 may also include one or more debug ports 446, which are coupled to the SoC 402. The memory and storage may be used to cache content, as well as store software, firmware or other data for the mesh network device 400.

The mesh network device 400 may also include a power management and charging system 434. The power management and charging system 434 can be connected to a power supply 436 (e.g., 240V outlet, 120V outlet, or the like). The power management and charging system 434 can also connect to a battery 438. The battery 438 can provide power in the event of power loss. The power management and charging system 434 can be configured to send a SoS message on power outage and backup system state. For example, the WLAN radios can be powered down, but the cellular radio can be powered by the battery 438 to send the SoS message. The battery 438 can provide limited operations by the mesh network device 400, such as for 10 minutes before the system is completely powered down. In some cases, power outage will likely affect a geographic area in which the mesh network device 400 is deployed (e.g., power outage that is a neighborhood wide phenomenon). The best option may be to power down the mesh network device 400 and let the cloud service (e.g., back end service) know of the outage in the WMN. The power management and charging system 434 may provide a 15V power supply up to 21 watts to the SoC 402. Alternatively, the mesh network device 400 may include more or less components to operate the multiple antennas as described herein.

The mesh network device 400 includes a first radio frequency (RF) module 404 coupled between the SoC 402 and a cellular antenna 418. The first RF module 404 supports cellular connectivity using the cellular antenna 418. In one embodiment, the cellular antenna 418 includes a primary wide area network (WAN) antenna element and a secondary WAN antenna element. The first RF module 404 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 404 may support other bands, as well as other cellular technologies. The mesh network device 400 may include a GPS antenna and corresponding GPS module to track the location of the mesh network device 400, such as moves between homes. However, the mesh network device 400 is intended to be located inside a structure, the GPS antenna and module may not be used in some embodiments.

The mesh network device 400 includes a first set of wireless local area network (WLAN) modules 406, 408 coupled between the SoC 402 and dual-band omnidirectional antennas 420. A first WLAN module 406 may support WLAN connectivity in a first frequency range using one of the dual-band omnidirectional antennas 420. A second WLAN module 408 may support WLAN connectivity in a second frequency range using one of the dual-band omnidirectional antennas 420. The dual-band omnidirectional antennas 420 may be two omnidirectional antennas for 2.4 GHz. The directional antennas 422 may be four sector directional antennas (e.g., four antennas) for 5 GHz. These can be setup with 45 degree 3 dB beam width with 11 dB antenna gain. The dual-band omnidirectional antennas 420 and the directional antennas 422 can be implemented as a fully switchable antenna architecture controlled by micro controller 426. For example, each 5 GHz radio can choose any 2 sectors (for 2 2×2 MU-MIMO streams).

The mesh network device 400 includes a second set of WLAN modules 410-416 coupled between the SoC 402 and antenna switching circuitry 424. The second set of WLAN modules 410-416 support WLAN connectivity in the second frequency range using a set of directional antennas 422. The second set of WLAN modules 410-416 is operable to communicate with the other mesh network devices of the WMN. The antenna switching circuitry 424 is coupled to a micro controller 426. The micro controller 426 controls the antenna switching circuitry 424 to select different combinations of antennas for wireless communications between the mesh network device 400 and the other mesh network devices, the client consumption devices, or both. For example, the micro controller 426 can select different combinations of the set of directional antennas 422.

In another embodiment, a filter switch bank is coupled between the antenna switching circuitry 424 and the second set of WLAN modules 410-416. In another embodiment, the filter switch bank can be implemented within the antenna switching circuitry 424.

In the depicted embodiment, the first set of WLAN modules include a first 2×2 2.4 GHz MIMO radio and a 2×2 5 GHz MIMO radio. The second set of WLAN modules includes a first 2×2 5 GHz MIMO radio ("5GLL"), a second 2×2 5 GHz MIMO radio ("5GLH"), a third 2×2 5 GHz MIMO radio ("5GHL"), and a fourth 2×2 5 GHz MIMO radio ("5GHH"). The dual-band omnidirectional antennas 420 may include a first omnidirectional antenna and a second omnidirectional antenna (not individually illustrated in FIG. 4). The set of directional antennas 422 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna). In one embodiment, four directional antennas may be coupled to one radio each with two additional directional antennas selectively couple-able to the four radios.

In one embodiment, the mesh network device 400 can handle antenna switching in a static manner. The SoC 402 can perform sounding operations with the WLAN radios to determine a switch configuration. Switching is not done on a per packet basis or at a packet level. The static switch configuration can be evaluated a few times a day by the SoC 402. The SoC 402 can include the intelligence for switching decision based on neighbor sounding operations done by the SoC 402. The micro controller 426 can be used to program the antenna switching circuitry 424 (e.g., switch matrix) since the mesh network device 400 may be based on CSMA-CA, not TDMA. Deciding where the data will be coming into the mesh network device 400 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 400 can adapt a beam patter to be essentially fixed since the mesh network devices are not intended to move once situated.

In one embodiment, the antenna switching circuitry 424 includes multiple diplexers and switches to connect different combinations of antennas to the multiple radios. For example, the antenna switching circuitry 424 can switch between configurations of the following antennas:

- ANT Hx→Horizontal orientation device side antenna
- ANT Vx→Vertical orientation device side antenna
- ANT VB→Vertical orientation device bottom side antenna
- ANT HB→Horizontal orientation device bottom side antenna
- ANT VU→Vertical orientation device top side antenna
- ANT HU→Horizontal orientation device top side antenna
- ANT0→Omni directional antenna
- ANT1→Omni directional antenna One configuration for the antenna switching circuitry 424 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the mesh network device 400.

FIGS. 5-13 are generally directed to the centralized RRM architecture of a wireless mesh network. The WMN 100 of FIG. 1 can be represented as a hierarchical wireless design that is divided into three layers: core, distribution, and access, as illustrated and described below with respect to FIG. 5.

Figure 5:
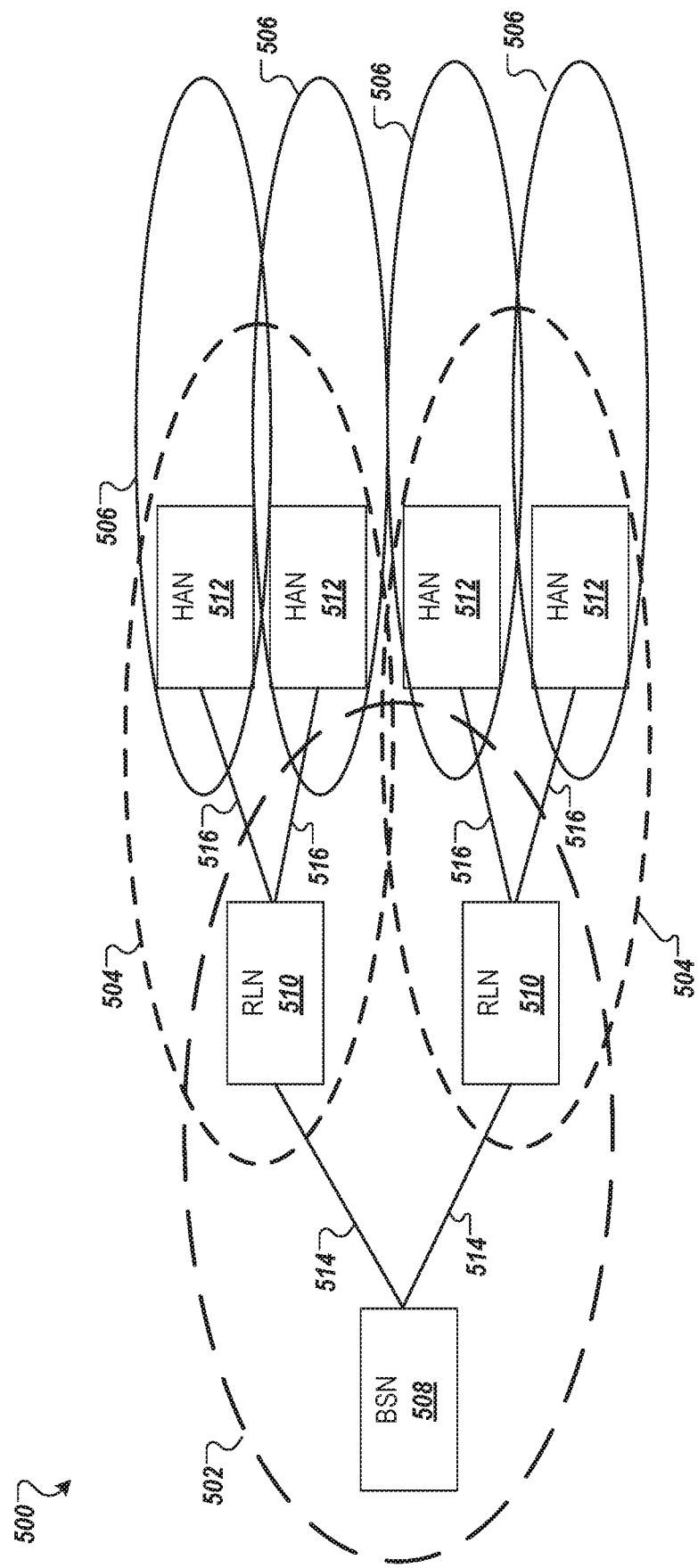
FIG. 5 is a mesh network architecture of a WLAN-based content delivery platform according to one embodiment.

FIG. 5 is a mesh network architecture 500 of a WLAN-based content delivery platform according to one embodiment. The mesh network architecture 500 uses a hierarchical wireless design and is divided into three layers: a core layer 502, a distribution layer 504, and an access layer 506. Network devices in one layer interconnect with network devices in other layers over WLANs (e.g., Wi-Fi networks). The core layer 502 is made up of base station nodes (BSNs) 508 that connect to an internet infrastructure, such as a fiber backbone network. The BSNs 508 also connect to relay nodes (RLNs) 510 over WLAN connections, labeled as BSN-RLN wireless links 514. The distribution layer 504 is made up of the RLNs 510. The RLNs 510 connect with the BSNs 508 as well as the home access nodes (HANs) 512 over WLAN connection, labeled as RLN-HAN wireless links 516. The access layer 506 is made up of the HANs 512. The HANs 512 connect with the RLNs 510 as well as provide WLAN connectivity to client consumption devices. The BSNs 508 can also be referred to as BSN access points (BSN APs) since they operate as access points with respect to the RLNs 510 and/or the HANs 512. The RLNs 510 can also be referred to as RLN APs since they operate as access points with respect to the HANs 512. The HANs 512 can also be referred to as HAN APs since they operate as access points with respect to the wireless client devices.

As described above, WLAN connectivity operating in unlicensed spectrum offers a cost-effective and scalable solution for a WWAN to be deployed over a large densely populated region. There are, however, a number of design challenges that come with this approach. The following describes some of the challenges that are addressed by the functionality of the centralized RRM architecture.

One challenge pertains to bandwidth and channel allocation. For bandwidth and channel allocation, the use of WLAN (e.g., Wi-Fi® technologies) in the unlicensed spectrum in India, for example, there is a finite set of twelve 20 MHz channels or six 40 MHz channels available on the 5 GHz band. The choice of bandwidth depends on the peak throughput (i.e. modulation and coding scheme (MCS) index) and the number of concurrent devices supported. For example, using 40 MHz for the BSN-RLN wireless links 514 and 20 MHz for the RLN-HAN wireless links 516. Using 20 MHz offers higher spatial reuse since there are more 20 MHz channel choices available. This reduces CCI and the number of WLAN nodes in that collision domain.

Another challenge pertains to interference (e.g., ACI/CCI). With a finite number of available channels, mesh network devices share a common spectrum with other mesh network devices and other WLAN devices for spatial reuse. Interference from these devices reduce link throughput and network capacity in terms of frame error rate, and media access control (MAC) efficiency. Network capacity, defined as bits per second per unit area, is a function of a spatial reuse. In turn, spatial reuse introduces both ACI and CCI. A tradeoff between spatial reuse and interference is required in order to maximize network throughput. Interference management is an important factor for designing an efficient and dense WLAN network.

Figure 6:
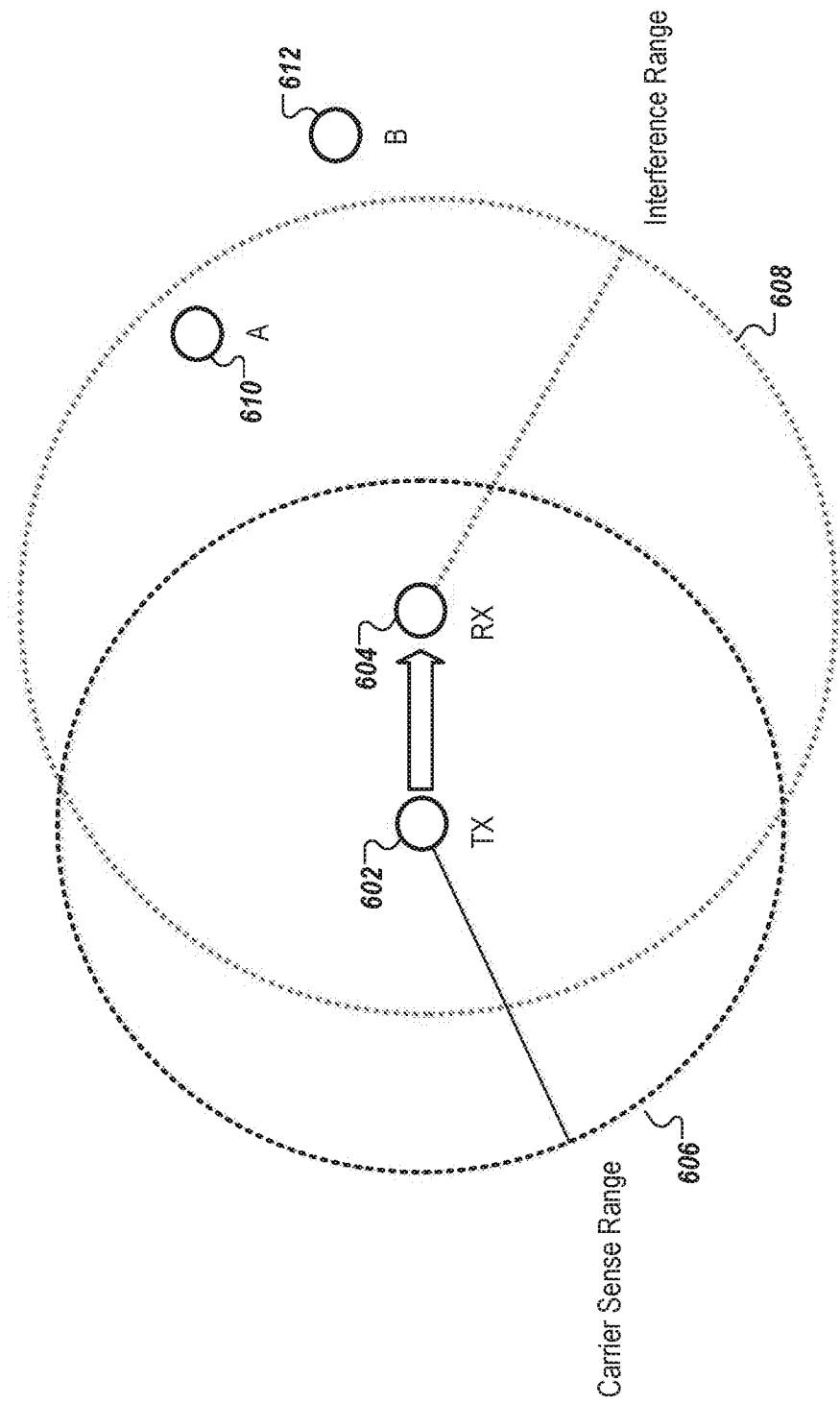
FIG. 6 is a diagram illustrating a carrier sense range and an interference range of two radios according to one embodiment.

FIG. 6 is a diagram illustrating a carrier sense range and an interference range of two radios according to one embodiment. In FIG. 6, a first radio 602 is transmitting data to a second radio 604. The first radio 602 has a corresponding carrier sense range 606. The second radio 604 has a corresponding interference range 608. In some cases, other network devices can be within the interference range 608, as illustrated with a first network device 610 being within the interference range 608 and a second network device 612 being outside the interference range 608.

Another challenge pertains to transmit power. Controlling transmit power determines the radio coverage of a basic service set (BSS), and the amount of interference it contributes to neighboring BSSs. In order to maximize network throughput, the transmit power of choice should be high enough to service all stations (STAs) within, and yet low enough to minimize the interference on neighboring STAs. STAs are also referred to herein as client consumption devices. Transmit power has a direct impact on radio coverage, and link budget.

Another challenge pertains to Energy Detect and Preamble Detect of the CSMA protocol. WLAN technologies (e.g., Wi-Fi® technology) are based on the CSMA protocol and uses clear channel assessment (CCA) to determine channel state, i.e. IDLE or BUSY. CCA is based on two thresholds: energy detect (ED) and preamble detect (PD). ED detects for energy above −62 dBm, and PD detects for any OFDM signal above −82 dBm. By controlling the ED or PD thresholds, this determines the fraction of time a mesh network device sees either IDLE or BUSY states. Changing these two thresholds allows the mesh network device to filter out certain WLAN frames. This has the similar effect of adjusting the coverage a BSS, but by tuning CSMA parameters.

Another challenge pertains to EDCA parameters. For example, the Wi-Fi® protocol provides four types of traffic prioritization by the way of EDCA parameters, i.e. CWmin, CWmax, AIFSN, and TXOP Limit. Given a finite set of channels available in an area, such as India, spatial reuse is inevitable. The traffic load requirements are different for the BSN-RLN and RLN-HAN wireless links. For a wireless mesh network, different sets of EDCA parameters can be used for the prioritization among the different wireless links operating on the same channel.

Aspects of the present disclosure address the above and other deficiencies by providing a centralized RRM architecture that provide data management and monitoring of a wireless mesh network, data analysis and visualization of the wireless mesh network, and staging and real-time radio resource management of radios within the wireless mesh network, as described below with respect to FIGS. 7-13. In particular, the centralized RRM architecture can provide functionality, including real-time or near real-time centralized channel assignment functionality, using time-series databases to calculate an optimal allocation of a desired set of network parameters (e.g., channels). The centralized RRM architecture can also provide visualization to graph and monitor current network conditions of the wireless mesh network.

The centralized RRM architecture can be a cloud-based architecture that utilizes processes, algorithms, and functions at one or more cloud servers in connection with mesh network devices of the mesh network. The cloud servers can provide the centralized RRM as a service to the mesh network. The cloud-based RRM can be highly extensible for a mix of wired and wireless networking topologies. The cloud-based RRM can be implemented to adapt each mesh network dynamically so as to operate efficiently for the targeted applications. In general, a device agent can perform operations to efficiently collect device metrics with minimal computation and bandwidth requirements. One or more databases can be used to handle time-series and dynamic device configurations of the mesh network device. This layered approach allows for scalability. The cloud-based RRM can also provide a network optimizer, a data visualizer, and a network operations center to monitor the health of the mesh network. The metric and data collected from the mesh network can be machine learnt to predict bandwidth and traffic provisioning and providing a targeted service level agreement (SLA) between a service provider and end customers. At the cloud layer, the network optimizer can offer a modular and efficient way to determine the optimal operating scenarios for the connected devices, as well as the operations to schedule and reliably apply the operating parameters to the devices in a coordinated way. One example of a cloud-based RRM architecture is described below with respect to FIG. 7.

Figure 7:
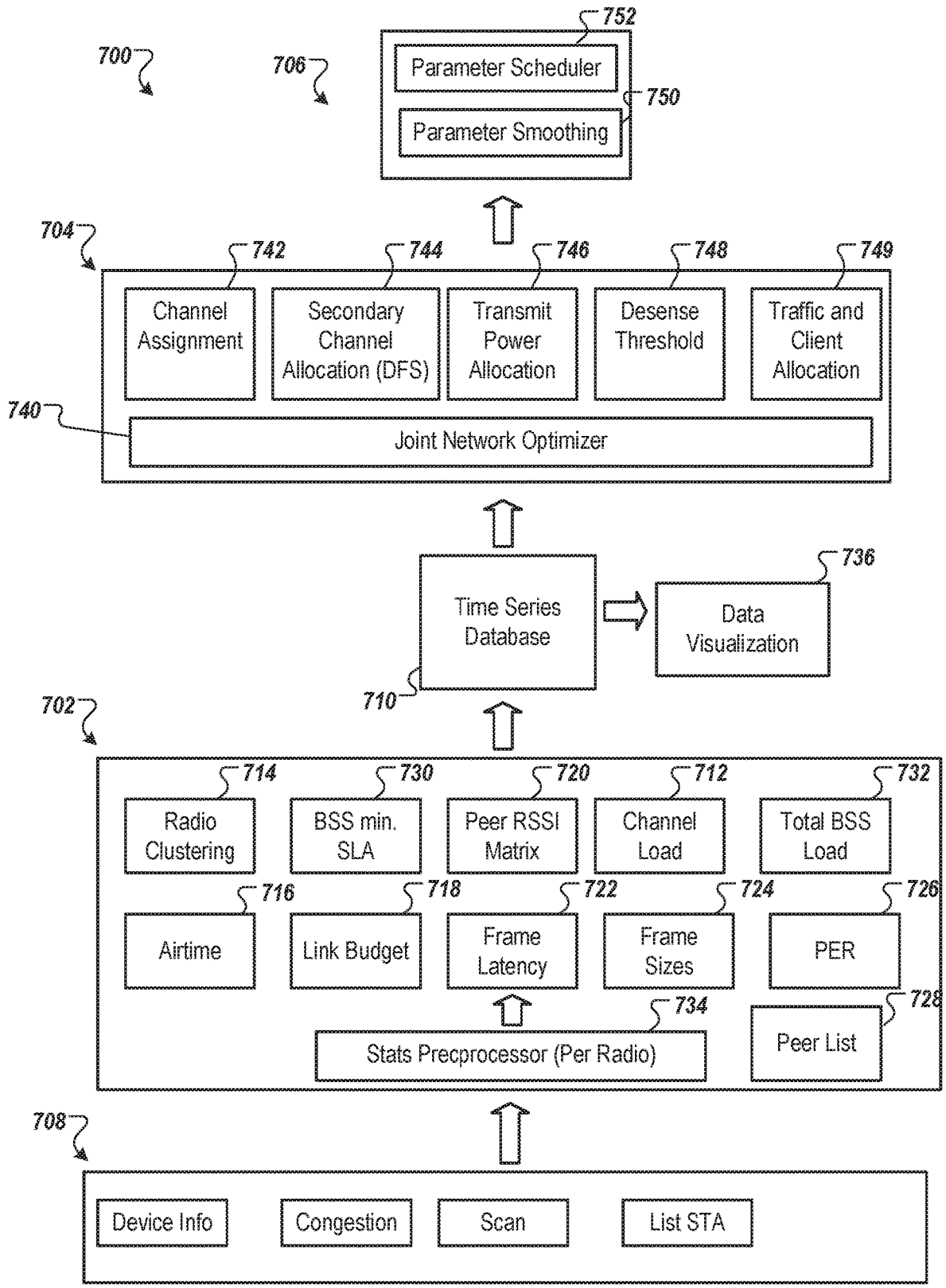
FIG. 7 a flow diagram of a cloud-based radio resource management (RRM) architecture of a mesh network according to one embodiment.

FIG. 7 is a flow diagram of a cloud-based RRM architecture 700 of a mesh network according to one embodiment. The cloud-based RRM architecture 700 is made up of three sub-layers, including a statistics preprocessor sub-layer 702, a network optimizer sub-layer 704, and a scheduler sub-layer 706. Each layer can be processing logic that comprises hardware (e.g., circuitry, dedicated logic, programmable logic, microcode, etc.), software, firmware, or a combination thereof. The statistics preprocessor sub-layer 702 takes processed device metrics stored in a database tables (e.g., DynamoDB tables) to derive time-series statistics per device and stores the time-series statistics in time-series database tables 710. The processed device metrics can be collected and processed by a device agent 708. Additional details of the device agent 708 are described below with respect to FIG. 9A. The statistics preprocessor sub-layer 702 can compute time-series statistics per device, such as an average channel load 712. The average channel load 712 can be computed for various time periods, such as a first specified time (e.g., 10 minutes), an average channel load per a second specified time (e.g., 1 hour), and an average channel load per a third specified time (e.g., day). The channel load 712 can be channel load per device, per radio cluster, and per network.

The statistics preprocessor layer 702 can also perform analytics on the device metrics to derive other statistics. For example, the statistics preprocessor layer 702 can perform one or more of the following: radio clustering 714, airtime 716 per device, per radio cluster, and per network, line budget 718, peer RSSI per network 720, frame latency per device 722, frame size 724, packet/frame error rate 726, peer list 728 (i.e., associated stations per AP or associated AP per station), BSS minimum SLA 730, total BSS load 732, or the like. The radio clustering 714, airtime 716 per device, per radio cluster, and per network, line budget 718, peer RSSI per network 720, frame latency per device 722, frame size 724, packet/frame error rate 726, peer list 728, BSS minimum SLA 730, and total BSS load 732 can be separate functions, separate sets of operations, separate algorithms, or separate services. Alternatively, these operations can be combined into one or more functions, algorithms, services, or the like. The statistics preprocessor layer 702 can include a stats preprocessor 734 per each radio of the mesh network device to process data received from the respective radio.

These various time-series statistic metrics can be stored in the time-series database(s) 710). The statistics preprocessor layer 702 can provide data visualization 736 to graph and monitor current network conditions of the wireless mesh network.

The network optimizer sub-layer 704 can perform a joint optimization of intended network parameters to derive the operating parameters that maximizes network throughput (i.e. bits/s). The network optimizer sub-layer 704 can include a joint network optimizer 740 that can perform one or more algorithms or sets of operations to derive specific operating parameters that result in a desired result in the wireless mesh network. For example, network optimizer sub-layer 704 can perform operations for one or more of the following: channel assignment logic 742, secondary channel allocation for dynamic frequency selection (DFS) logic 744, transmit power allocation logic 746, desense threshold logic 748, traffic and client allocation logic 749, or the like.

For example, channel assignment logic 742 can use the derived peer RSSI matrix 720 and channel load 712 per each media access control (MAC) address. The channel assignment 742 can assign each access point (AP) a channel that minimizes a total cost for the entire wireless mesh network. In one embodiment, the channel assignment logic 742 can assign a channel to each radio of the first radio cluster using a minimum weight matching algorithm. The minimum weight matching algorithm selects the channel having a lowest channel load between each of the radios in the first radio cluster. The channel assignment logic 742 can assign a channel to each radio of the second radio cluster using the minimum weight matching algorithm, the minimum weight matching algorithm selects the channel having a lowest channel load between each of the radios in the second radio cluster. The cost function can be channel load 712 at each AP. In one implementation, the operations of the channel assignment logic 742 can be a derived version of a maximum bipartite matching algorithm that accounts for limited channels versus a number of lightly loaded APs. Additional details of the channel assignment logic 742 are described below with respect to FIGS. 8A-8D.

Another example is transmit power allocation logic 744. The transmit power allocation logic 744 are operations that can assign transmit power levels for devices in a single BSS that minimizes transmit power while meeting the requirement link budget targets. Operations of the transmit power allocation logic 744 can minimize an interference due to this BSS on other neighboring BSSes. In turn, the transmit power allocation logic 744 can improve overall network throughput.

The scheduler sub-layer 706 can perform multiple functions, including parameter smoothing 750 and parameter scheduling 752. The parameter smoothing 750 can reduce hysteresis on the network operating parameters. When a new set of operating parameters is derived, the parameter smoothing 750 can compare a current set of operating parameters and a new set of operating parameters calculated to determine if the new set of parameters should be applied. The parameter scheduler 752 can apply the new set of parameters to the mesh network devices according to a priority scheme. For example, the parameter scheduler 752 can apply the new set of parameters using the AWS IOT service via an API gateway. As described above with respect to FIG. 5, the wireless mesh network can have a WLAN topology, including BSN-RLN wireless links 514, RLN-HAN wireless links 516, and HAN-client wireless links. In one implementation, the parameter scheduler 752 can apply the new channels from the channel assignment 742 to all BSN APs first and then periodically check the channels in the peer list 728 to make sure all BSN Aps have switched over to the new channel(s). Then, the parameter scheduler 752 can apply the new channels to all RLN APs and can periodically check the channels in the peer list 728 to make sure all the RLN APs have switched over to the new channel(s). Then, the parameter scheduler 752 can apply the new channels to the HAN APs. Alternatively, the parameter scheduler 752 can apply the new channels in other manners. The parameter scheduler 752 can coordinate and ensure a reliable transition of the network to the new operating parameters. In the event of errors, the parameter scheduler 752 is responsible for reverting the network back to the previous operating parameters.

Figure 8A:
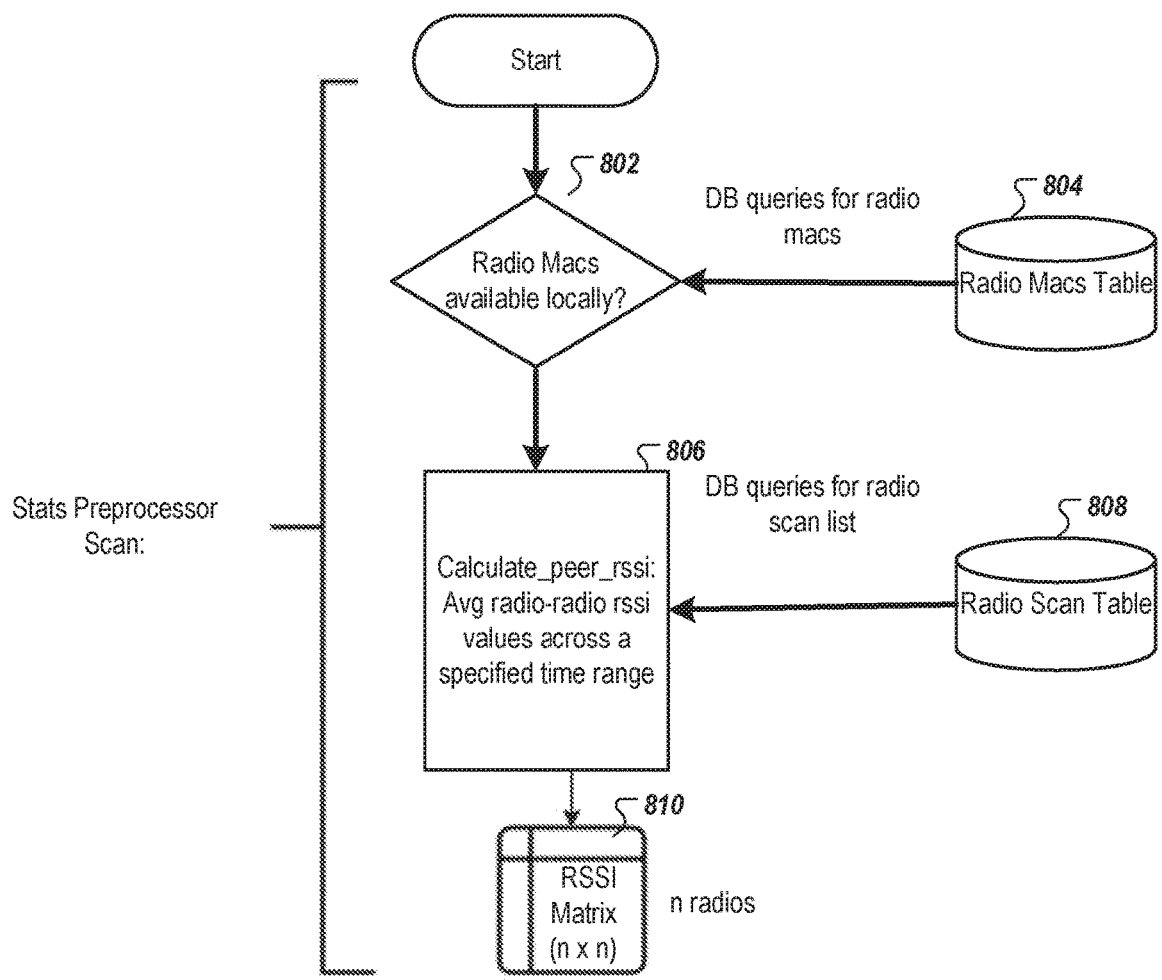
FIG. 8A is a flow diagram of a method of generating an RSSI matrix of a wireless mesh network according to one embodiment.

FIG. 8A is a flow diagram of a method 800 of generating an RSSI matrix of a wireless mesh network according to one embodiment. The method 800 may be performed by processing logic that comprises hardware (e.g., circuitry, dedicated logic, programmable logic, microcode, etc.), software, firmware, or a combination thereof. In one embodiment, the statistics preprocessor sub-layer 702 performs the method 800. Alternatively, the status preprocessor 734 performs the method 800 as the peer RSSI matrix function 720 described above with respect to FIG. 7. In another embodiment, the method 800 may be performed by a server (e.g., a cloud server, a remote server, or the like). Alternatively, some of the method 800 can be performed by a central controller device that operates as a central controller for the mesh network device of a wireless mesh network. In some cases, the operations of method 800 can be distributed between one of the mesh network devices and a central controller or a server to which the mesh network devices communicate for management of the wireless mesh network.

Referring to FIG. 8A, the method 800 begins by the processing logic determining whether radio MAC addresses are available locally (block 802). When the radio MAC addresses are not locally available at block 802, the processing logic can query a radio MAC address table 804 for the radio MAC addresses. The following shows an example entry of the radio MAC address table 804 that corresponds to a radio with a specific MAC address.

{'00000000000000aa': [{'bitrate': '400.0', 'channel': 36, 'essid': '"RRM_GW_5G"', 'ifmac': '00-00-00-00-aa-00', 'metric_timestamp': 1557123770, 'mode': 'Master', 'status': 'gw--RRM_GW1', 'txpower': '15.0'}, {'bitrate': '400.0', 'channel': 36, 'essid': '"RRM_GW_5G"', 'ifmac': '00-00-00-00-aa-01', 'metric_timestamp': 1557123770, 'mode': 'Master', 'status': 'gw--RRM_GW1', 'txpower': '15.0'}], '00000000000000bb': [{'bitrate': '400.0', 'channel': 36, 'essid': '"RRM_GW_5G"', 'ifmac': '00-00-00-00-bb-00', 'metric_timestamp': 1557123770, 'mode': 'Master', 'status': 'gw--RRM_GW1', 'txpower': '15.0'}, {'bitrate': '400.0', 'channel': 36, 'essid': '"RRM_GW_5G"', 'ifmac': '00-00-00-00-bb-01', 'metric_timestamp': 1557123770, 'mode': 'Master', 'status': 'gw--RRM_GW1', 'txpower': '15.0'}]}

The entry can include the MAC address as an index and various attributes, including for example, a bitrate, a channel assignment, a frequency band, a timestamp, a mode, transmit power, or the like.

With the radio MAC addresses at block 802, the processing logic can calculate peer RSSI values across a specified time range (block 806). The peer RSSI values can be radio-to-radio RSSI values. The radio-to-radio RSSI value indicates a signal strength between a radio of a first AP device and a radio of a second AP device. To calculate the peer RSSI values, the processing logic queries a radio scan table 808 to retrieve a radio scan list. The following shows an example list that can be stored in the radio scan table 808 that is stored at the server.

Interface: [List of neighbor MAC addresses and signal strengths over time]

00-00-00-00-cc-00: [{'key': '00-00-00-00-cc-01', 'val': −30}, {'key': '00-00-00-00-dd-01', 'val': −60}, {'key': '00-00-00-00-dd-00', 'val': −70}]
00-00-00-00-cc-01: [{'key': '00-00-00-00-cc-00', 'val': −30}, {'key': '00-00-00-00-dd-00', 'val': −60}, {'key': '00-00-00-00-dd-01', 'val': −70}]
00-00-00-00-dd-00: [{'key': '00-00-00-00-dd-01', 'val': −30}, {'key': '00-00-00-00-cc-01', 'val': −60}, {'key': '00-00-00-00-cc-00', 'val': −70}]
00-00-00-00-dd-01: [{'key': '00-00-00-00-dd-00', 'val': −30}, {'key': '00-00-00-00-cc-00', 'val': −60}, {'key': '00-00-00-01-cc-01', 'val': −70}]
00-00-00-00-00-00: [{'key': '00-00-00-00-00-01', 'val': −30}, {'key': '00-00-00-00-11-01', 'val': −60}, {'key': '00-00-00-00-11-00', 'val': −70}]
00-00-00-00-00-01: [{'key': '00-00-00-00-00-00', 'val': −30}, {'key': '00-00-00-00-11-00', 'val': −60}, {'key': '00-00-00-00-11-01', 'val': −70}]
00-00-00-00-11-00: [{'key': '00-00-00-00-11-01', 'val': −30}, {'key': '00-00-00-00-00-01', 'val': −60}, {'key': '00-00-00-00-00-00', 'val': −70}]

-continued

Interface: [List of neighbor MAC addresses and signal strengths over time]

00-00-00-00-11-01: [{'key': '00-00-00-00-11-00', 'val': −30}, {'key': '00-00-00-00-ee-01',
'val': −50}, {'key': '00-00-00-00-00-00', 'val': −60}, {'key': '00-00-00-00-00-01', 'val': −70}]
00-00-00-00-ee-00: [{'key': '00-00-00-00-ee-01', 'val': −30}, {'key': '00-00-00-00-ff-01', 'val':
−60}, {'key': '00-00-00-00-ff-00', 'val': −70}]
00-00-00-00-ee-01: [{'key': '00-00-00-00-ee-00', 'val': −30}, {'key': '00-00-00-00-11-01',
'val': −50}, {'key': '00-00-00-00-ff-00', 'val': −60}, {'key': '00-00-00-00-ff-01', 'val': −70}]
00-00-00-00-ff-00: [{'key': '00-00-00-00-ff-01', 'val': −30}, {'key': '00-00-00-00-ee-01', 'val':
−60}, {'key': '00-00-00-00-ee-00', 'val': −70}]
00-00-00-00-ff-01 [{'key': '00-00-00-00-ff-00', 'val': −30}, {'key': '00-00-00-00-ee-00', 'val': −
60}, {'key': '00-00-00-00-ee-01', 'val': −70}]

The processing logic can calculate an average radio-to-radio RSSI values across the specified time for the radios of the radio scan list. The radio-to-radio RSSI value indicates a signal strength between a radio of a first AP device and a radio of a second AP device. The processing logic can output the peer RSSI values into a peer RSSI matrix 810 for n radios in the radio scan list. The RSSI matrix 810 can be an n×n matrix. Rows of the peer RSSI matrix include radio identifiers of the radios of the AP device and each column includes radio identifiers of the radios of other AP devices that can communicate with the AP device. Each element of the matrix includes an RSSI value measured at a radio of one AP device and is indicative of a signal strength of a link between the radio of the AP device and a radio of another (e.g., a peer) AP device. The peer RSSI matrix 810 is similar to the peer RSSI matrix 720 of FIG. 7. Table 1A shows a sample peer RSSI matrix:

TABLE 1A

PEER RSSI MATRIX

|  | Radio1 (peer1) | Radio1 (peer 2) | Radio3 (peer 3) |
| --- | --- | --- | --- |
| Radio1 | −50 | −60 | −30 |
| Radio2 | −53 | −70 | −60 |
| Radio3 | −30 | −50 | −50 |

For example, considering the last row and first column, the peer RSSI matrix includes an RSSI value of −30 measured at radio3 of the respective AP device and is indicative of a signal strength between the radio3 and radio1 of a peer AP device (peer 1).

Figure 8B:
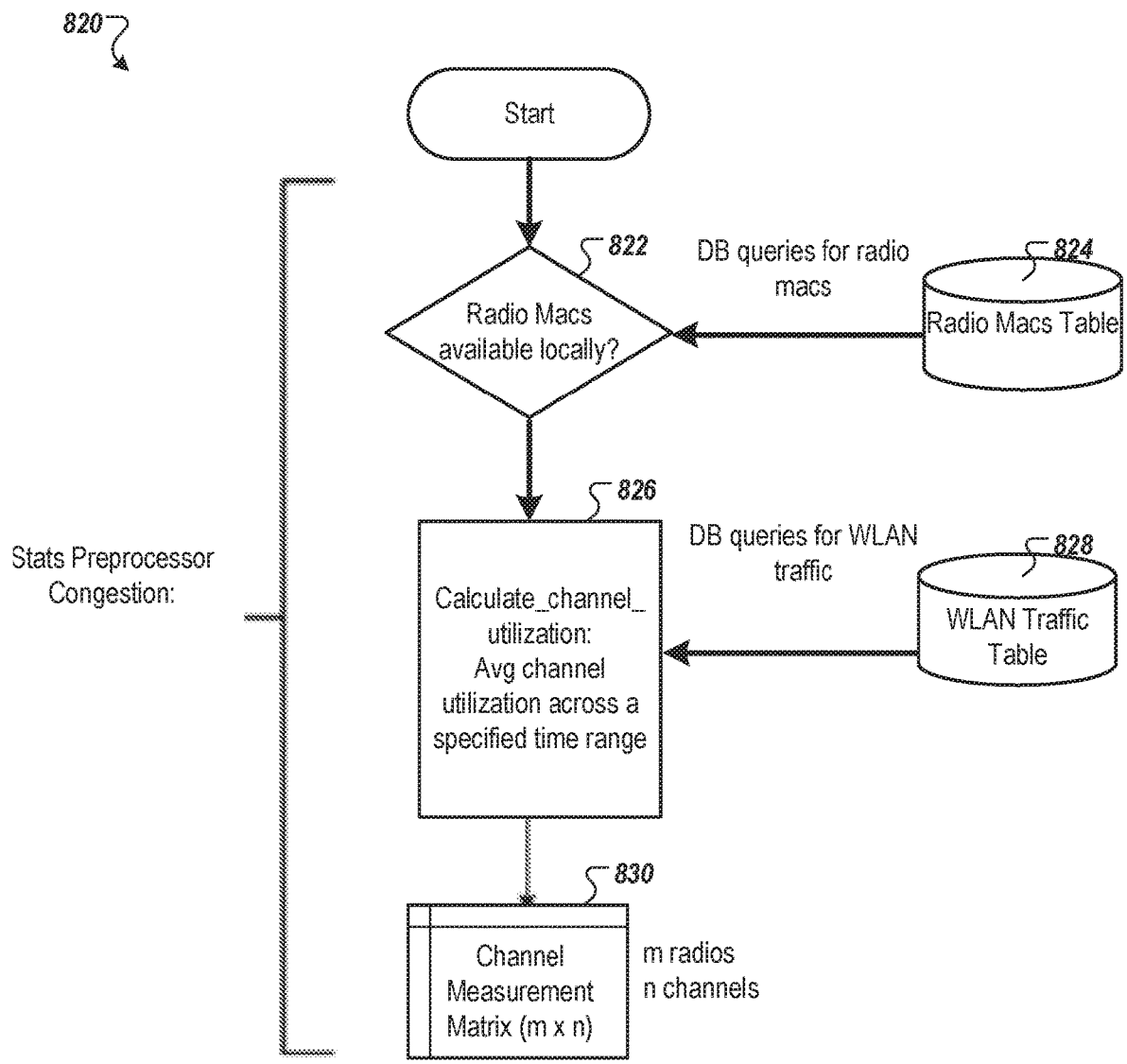
FIG. 8B is a flow diagram of a method of generating a channel measurements matrix of a wireless mesh network according to one embodiment.

FIG. 8B is a flow diagram of a method 820 of generating a channel measurements matrix of a wireless mesh network according to one embodiment. The method 820 may be performed by processing logic that comprises hardware (e.g., circuitry, dedicated logic, programmable logic, microcode, etc.), software, firmware, or a combination thereof. In one embodiment, the statistics preprocessor sub-layer 702 performs the method 820. Alternatively, the status preprocessor 734 performs the method 820 as the channel load function 712 described above with respect to FIG. 7. In another embodiment, the method 820 may be performed by a server (e.g., a cloud server, a remote server, or the like). Alternatively, some of the method 820 can be performed by a central controller device that operates as a central controller for the mesh network device of a wireless mesh network. In some cases, the operations of method 820 can be distributed between one of the mesh network devices and a central controller or a server to which the mesh network devices communicate for management of the wireless mesh network.

Referring to FIG. 8B, the method 820 begins by the processing logic determining whether radio MAC addresses are available locally (block 822). When the radio MAC addresses are not locally available at block 822, the processing logic can query a radio MAC address table 824 for the radio MAC addresses. With the radio MAC addresses at block 822, the processing logic can calculate channel measurements across a specified time range (block 826). To calculate the channel measurements, the processing logic queries a WLAN traffic table 828 and receives the data from WLAN traffic table 828. The WLAN traffic table 828 can store channel utilization metrics in terms of energy and time. For example, the WLAN traffic table 828 can store a timestamp (x) and energy level (y) per channel seen by each radio. Alternatively, each entry can include a timestamp and energy per channel on a radio basis. The processing logic can calculate an average channel measurement across the specified time for the radios of the radio scan list. The average channel utilization metric indicates a channel load for the respective channel. The processing logic can output the channel measurements into a channel measurements matrix 830 for m radios and n channels in the radio scan list. The rows of the channel measurements matrix include radio identifiers of the radios of the AP device and the columns of the channel measurements matrix include channel identifiers of channels of the radios. Each element includes the average channel utilization metric measured at the respective AP device and is indicative of channel quality of a channel of a respective radio of the respective radio of the respective AP device. The channel measurements matrix 830 can be an m×n matrix, where m is the number of radios and n is the number of channels. Alternatively, the channel measurements matrix 830 can be other data structures, such as a buffer that stores the data as linear data or a list. The channel measurements matrix 830 is similar to an output of the channel load 712 of FIG. 7. An example of the channel measurements matrix is described below with respect to FIG. 8C.

Figure 8C:
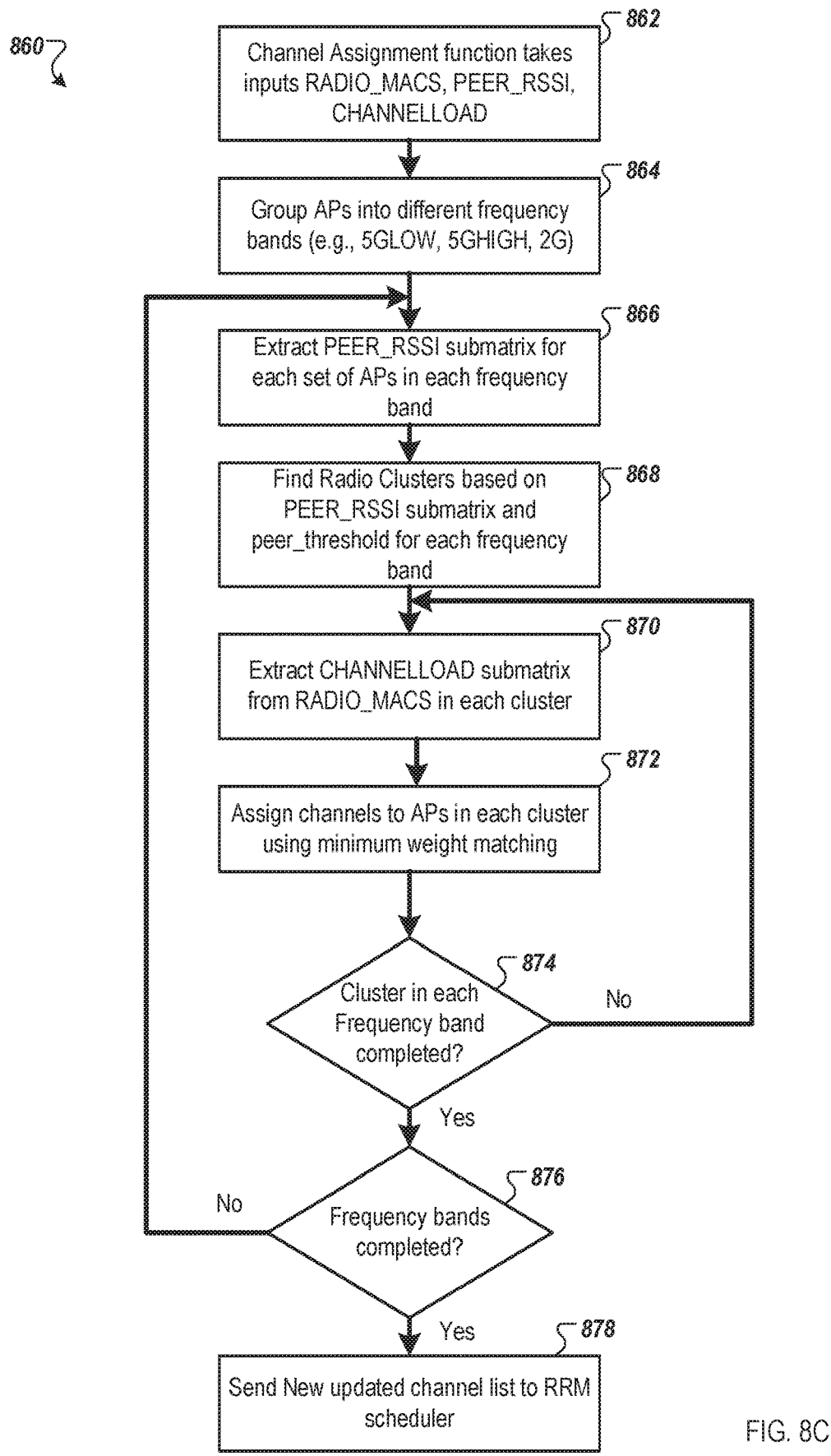
FIG. 8C is a flow diagram of a method of generating a channel assignment list of channel assignments for mesh network devices of a wireless mesh network according to one embodiment.

FIG. 8C is a flow diagram of a method 860 of generating a channel assignment list of channel assignments for mesh network devices of a wireless mesh network according to one embodiment. The method 860 may be performed by processing logic that comprises hardware (e.g., circuitry, dedicated logic, programmable logic, microcode, etc.), software, firmware, or a combination thereof. In one embodiment, the joint network optimizer sub-layer 704 performs the method 860. Alternatively, the joint network optimizer 740 performs the method 860 as the channel assignment function 742 described above with respect to FIG. 7. In another embodiment, the method 860 may be performed by a server (e.g., a cloud server, a remote server, or the like). Alternatively, some of the method 860 can be performed by a central controller device that operates as a central controller for the mesh network device of a wireless mesh network.

Referring to FIG. 8C, the method 860 begins by the processing logic taking the following inputs: radio MAC addresses, the peer RSSI matrix, and the channel load in the form of the channel measurements matrix (block 862). The processing logic groups the APs into different frequency bands (block 864). For example, the processing logic can group the APs into 5 GHz low band (5GLOW), 5 GHz high band (5GHIGH) and 2.4 GHz (2G). The processing logic extracts a peer RSSI submatrix for each set of APs in each frequency band (block 866). The processing logic finds radio clusters based on the peer RSSI submatrix and a peer threshold, specified for each frequency band (block 868). AP Devices that have higher radio-to-radio RSSI values between each other that exceed a threshold value are presumed to be in close proximity to one another, suggesting that the AP devices are in the same cluster of AP devices. Conversely, AP devices that have lower radio-to-radio RSSI values between each other that exceed the threshold value are presumed to be farther away from another, suggesting that the AP devices are not in the same cluster of AP devices. The processing logic can extract a channel load submatrix from the radio MAC addresses in each cluster (block 870). The processing logic assigns channels to APs in each cluster using a minimum weighting matching (block 872).

The following describes an example of the minimum cost algorithm. The CHANNELLOAD matrix in this example includes three radio MAC addresses in the 5G Low bands (i.e. channel 36, 40, 44, 48) as shown in Table 1B below. The elements include a value that represents the channel load for the particular radio and channel. The channel load can be expressed as an amount of busy time on the channel for the respective radio. For example, the number 40 that is associated with Radio C and CH36 in Table 1B below means that radio C on channel 36 has a channel load value of 40 that is higher than the channel load of Radio B and Radio A for channel 36.

TABLE 1B

CHANNELLOAD MATRIX for this cluster

|  | CH36 | CH40 | CH44 | CH48 |
|---|---|---|---|---|
| Radio A | 20 | 10 | 30 | 5 |
| Radio B | 10 | 20 | 10 | 5 |
| Radio C | 40 | 20 | 10 | 20 |

In a first operation of the minimum cost algorithm, the lowest number in a row is subtracted from each element in each row. For example, considering the last row in Table 1B above (i.e. the row related to Radio C), we can see that 10 is the lowest number in the row. So subtracting 10 from each of the values (40, 20, 10, and 20) in the row gives the results shown in Table 1C below.

TABLE 1C

|  | CH36 | CH40 | CH44 | CH48 |
|---|---|---|---|---|
| Radio A | 15 | 5 | 25 | 0 |
| Radio B | 5 | 15 | 5 | 0 |
| Radio C | 30 | 10 | 0 | 10 |

A check is made to see if an assignment can be made in which there is at least one element in each column with a zero value and there is at least one element in each row with a zero value before assigning the channels. For example, considering the last two columns in Table 1C corresponding to channels 44 and 48, there is at least element with a zero value, however, the first two columns there are no zero values. Because not all columns include at least one element with a zero value, the process continues. In a second operation of the minimum cost algorithm, the lowest number in the columns without at least one element with a zero value is subtracted from each element in the column. For example, considering the first column in Table 1C above (i.e. the column related to Channel 36), we can see that 5 is the lowest number in the column. So subtracting 5 from each of the values in the first column (15, 5, and 30) gives the results shown in Table 1D below. Similarly, 5 is the lowest number in the second column (i.e., the column related to Channel 40), and subtracting 5 from each of the values in the second column (5, 15, and 10) gives the results shown in Table 1D below.

TABLE 1D

|  | CH36 | CH40 | CH44 | CH48 |
|---|---|---|---|---|
| Radio A | 10 | 0 | 25 | 0 |
| Radio B | 0- | 10 | 5 | 0 |
| Radio C | 25 | 5 | 0 | 10 |

Another check is made to see if an assignment can be made in which there is at least element in each column with a zero value. Because all columns include at least one element with a zero value, the channel assignments can be made to all radios and channels. In the example, the following assignments can be made: Radio A is assigned channel 48, radio B is assigned channel 36, and radio C is assigned channel 44. The total minimum cost can be determined by adding the original values for the selected cells. For example, considering Radio A being assigned channel 48, radio B being assigned channel 36, and radio C being assigned channel 44, the original values of the corresponding elements had values of 10, 10, and 10. So, the total minimum cost of the assignment is 30 (e.g., 10+10+10=30). Alternatively, the minimum cost algorithm can be implemented using other techniques.

Referring back to FIG. 8, at block 874, the processing logic determines whether the clusters in each frequency band are completed. When the clusters in each frequency band are not completed, the processing logic returns to block 870 to repeat the operations at blocks 872 and 872 until the clusters in each frequency band are completed at block 874. When the clusters in each frequency band are completed, the processing logic determines whether the frequency bands are completed (block 876). When the frequency bands are not completed at block 876, the processing logic returns to block 866 to repeat the operations at block 866-874 until the frequency bands are completed at block 876. When the frequency bands are completed at block 876, the processing logic scan store or otherwise provide a channel assignment list to the scheduler sub-layer 706. The channel assignment list can be the output of the channel assignment function 742 of FIG. 2. The channel assignment list can be an input to the parameter scheduler 752 and the parameter smoothing function 750.

Figure 8D:
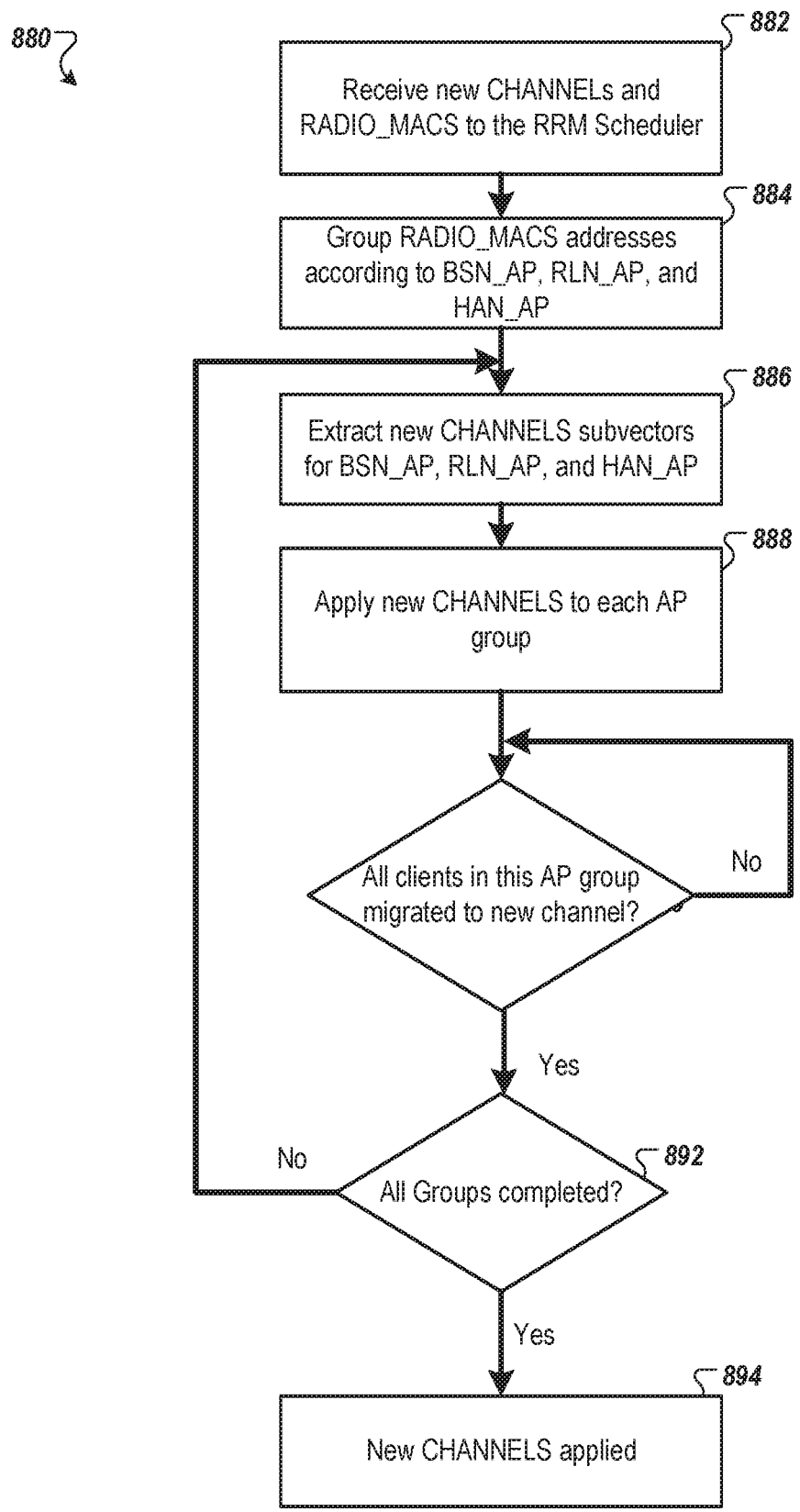
FIG. 8D is a flow diagram of a method of scheduling channel assignments for mesh network devices of a wireless mesh network according to one embodiment.

FIG. 8D is a flow diagram of a method 880 of scheduling channel assignments for mesh network devices of a wireless mesh network according to one embodiment. The method 880 may be performed by processing logic that comprises hardware (e.g., circuitry, dedicated logic, programmable logic, microcode, etc.), software, firmware, or a combination thereof. In one embodiment, the scheduler sub-layer 706 performs the method 880. Alternatively, the parameter scheduler 752 performs the method 860 as the parameter scheduling and parameter smoothing functions of the scheduler sub-layer 706. In another embodiment, the method 880 may be performed by a server (e.g., a cloud server, a remote server, or the like). Alternatively, some of the method 880 can be performed by a central controller device that operates as a central controller for the mesh network device of a wireless mesh network.

Referring to FIG. 8D, the method 880 begins by the processing logic taking the following inputs: radio MAC addresses and the new channel list (block 882). The processing logic groups the radio MAC addresses into AP groups according to network device types, including a group of BSN AP devices, a group of RLN AP devices, and a group of HAN AP devices (block 884). The processing logic extracts new channels subvectors for a first one of the AP groups of BSN AP devices, RLN AP devices, and HAN AP devices (block 886). The processing logic applies the new channels to each AP group (block 888). That is the processing logic can send the channel assignment sublist to each AP group that causes channels to be assigned to the AP group according to the channel assignment sublist. The processing logic can check to confirm that all client radios in an AP group have changed to the new channel (block 890). If not all client radios in this AP group have changed to the new channels, the processing logic can continue to re-check this condition. When all client radios in the AP group have changed to the new channel at block 890, the processing logic determines if all AP groups have completed (block 892). When not all groups have been completed at block 892, the processing logic returns to block 882 to extract the new channels subvectors for a next AP group and repeats operations at blocks 886-890. When all the groups have been completed at block 982, the processing logic determines that all new channels have been applied (block 894). In the event that there are errors during the method 880, the processing logic can operate to restore previous channel assignments.

As described above, the centralized RRM architecture provides dynamic channel assignment (DCA) functionality. The DCA function manages the allocation of the operating channel and bandwidth for APs in the same radio group. For each device in each BSS, the DCA function evaluates the interference observed on each available channel. Based on channel interference and RSSI, the DCA function reallocates the operating channels for APs to maximize the network throughput and required traffic load. The DCA function also manages the operating bandwidth (i.e. 20 MHz or 40 MHz).

Figure 9A:
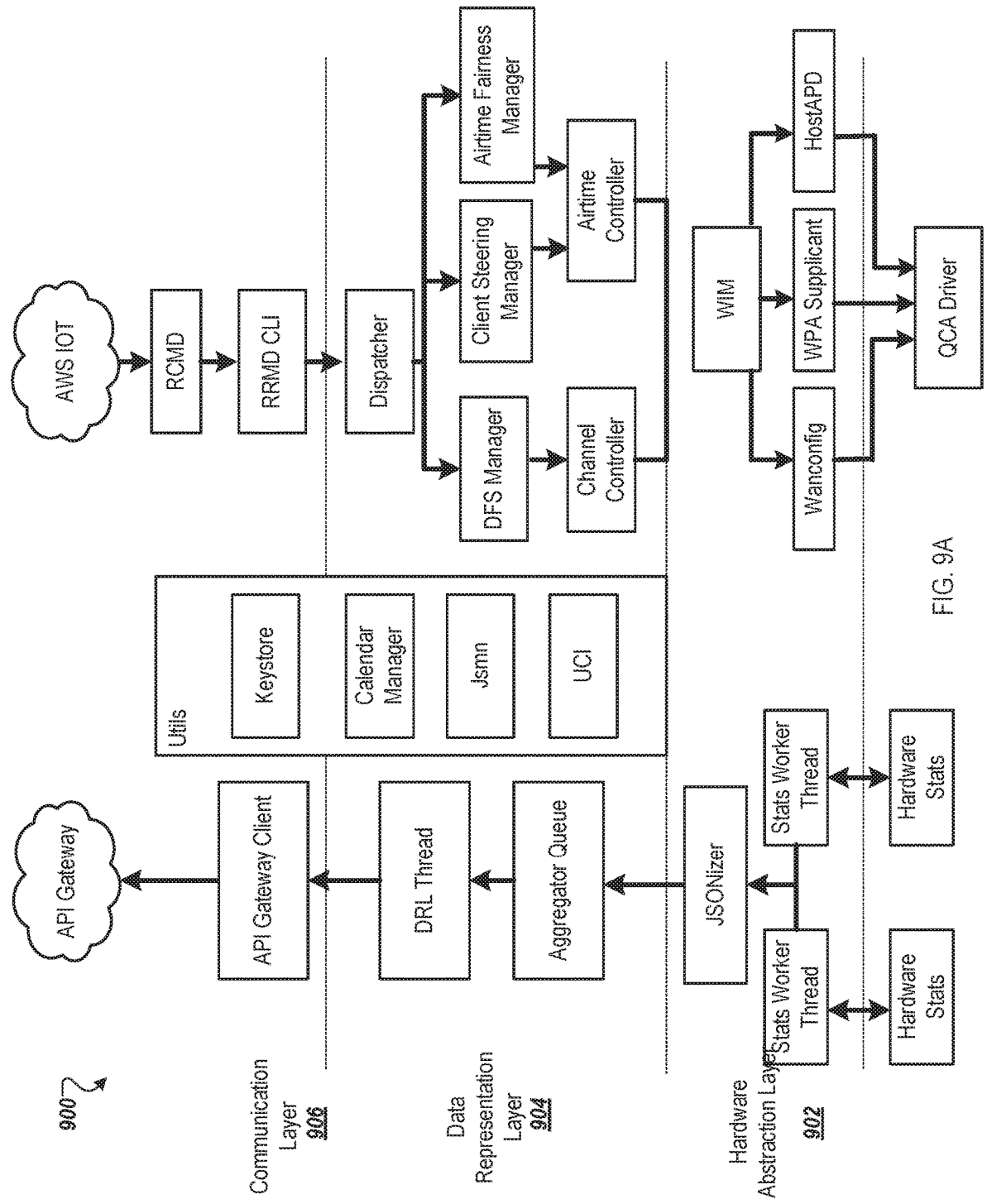
FIG. 9A is block diagram of multiple layers of a RRM device agent of a centralized RRM architecture according to one embodiment.

FIG. 9A is block diagram of multiple layers of a RRM device agent 900 of a centralized RRM architecture according to one embodiment. The RRM device agent 900 is responsible for carrying out time-sensitive optimizations, delegating RRM cloud operations, and collecting wireless statistics. The RRM device agent 900 can have two main responsibilities: provide status reports and network management. The RRM device agent 900 can collect, aggregate, and report network statistics based on time, event triggers, or both. The time-based triggers can be periodic triggers, or specific date/time triggers. The event triggers can be moving average threshold triggers, minimum value threshold triggers, maximum value threshold triggers, or the like.

In the depicted embodiment, the RRM device agent 900 includes a hardware abstraction layer 902, a data representation layer 904, and a communication layer 906. The hardware abstraction layer 902 can include one or more statistic worker threads that extract hardware specific statistics and queues reports in a uniform format to the data representation layer 904. For example, the data representation layer 904 can utilize a Javascript® object notation (JSON) formatter (or JSONizer) that formats the hardware specific statics into a JSON. The statistic worker threads can queue the JSON reports in an aggregator queue of the data representation layer 904. In some cases, the statistic worker thread can reserve its exclusive time slots with a Calendar Manager utility. For example, an off channel scan can be an exclusive operation.

The data representation layer 904 also includes a data representation layer (DRL) thread to process JSON reports for the communication layer 906. In particular, the data representation thread can aggregate the reports and pass them to the communication layer 906. The communication layer 906 can include an API gateway client that sends the JSON reports to the API gateway, such as the API gateway to the cloud-based RRM described above with respect to FIG. 7. For example, the communication layer 906 can retrieve an upload key from a keystore utility and post the records to the API gateway.

The RRM device agent 900 can collect device and network statistics of the mesh network devices of the wireless mesh network. The RRM device agent 900 can collect device and network metrics with minimal computation and bandwidth requirements. The collected metrics can be used by the cloud-based RRM to perform network optimization, data visualization, health monitoring, dynamic configuration of operating parameters, and the like. Each statistic worker thread can have a mirror worker thread on the RRM cloud. For example, a congestion RRMD worker thread can have a corresponding Congestion RRM cloud worker thread that understands the semantic of Congestion. The data pipeline of the RRM device agent 900 can be semantic agnostic.

In addition to collecting metrics, the RRM device agent 900 can be used for network management. The RRM device agent 900 can be responsible for carrying out RRM cloud operations, handling time sensitive operations, such as DFS management. The RRM device agent 900 can receive new operating parameters from the cloud-based RRM. In particular, in the communication layer 906, the RRM device agent 900 includes a remote command daemon (RCMD) and AWS TOT to issue commands to a radio resource daemon (RRMD) command line interface (CLI). That is the RRMD CLI receives commands, including configuration commands, from the cloud-based RRM, such as via an AWS TOT service. The data representation layer 904 can include a dispatcher that can dispatch the commands to different functions, including a channel coordinator and an airtime controller. The data representation layer 904 can also include a DFS manager, a client steering manager, and airtime fairness manager. The airtime fairness manager and client steering manager are responsible for monitoring the activities from connected peers/clients and adjusting the airtime parameters. The airtime controller is responsible for storing the airtime configuration and ensuring the configuration is persistent over reboots. The DFS manager is responsible for scheduling channel availability check (CAC) with the Calendar Manager utility. The channel controller is responsible for maintaining the Channel Priority List and issuing channel changes through wireless interface manager (WIM) in the hardware abstraction layer 902. The hardware abstraction layer 902 can also include various features, such as the Wlanconfig, WPA Supplicant, and HostAPD functions that interact with a QCA driver.

Figure 9B:
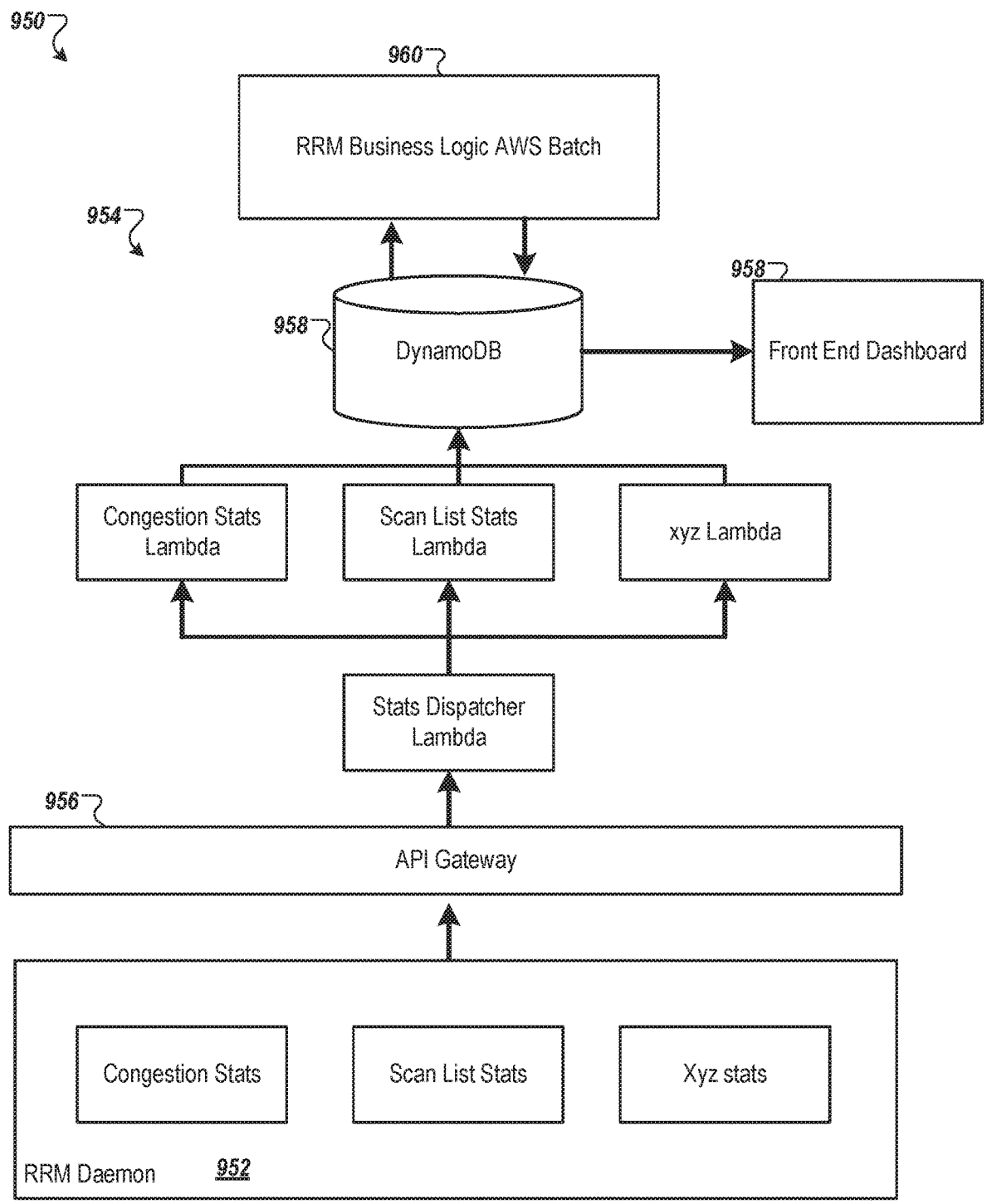
FIG. 9B is a block diagram of a RRM device daemon and a RRM cloud daemon of a centralized RRM architecture according to one embodiment.

The RRM device agent 900 can be implemented in a RRM device daemon that interacts with a RRM cloud daemon, as described and illustrated with respect to FIG. 9B.

FIG. 9B is a block diagram of a RRM device daemon 952 and a RRM cloud daemon 954 of a centralized RRM architecture 950 according to one embodiment. The RRM device daemon 952 and the RRM cloud daemon 954 can communicate via the API gateway 956. The RRM device daemon 952 can include one or more agents, such as a congestion statistics agent, a scan list statistics agent, as well as other statistic agents (labeled xyz stats). These agents can be worker threads, for example. As noted above, the RRM cloud daemon 954 can have corresponding agents, such as a congestion statistics agent, a scan list statistics agent, and other statistic agents. These agents can be serverless compute services that run code in response to events. For example, each of the agents can be implemented as an AWS Lambda that runs specific operations in response to events. The RRM cloud daemon 954 can also use a statistics dispatcher agent (also could be implemented as an AWS Lambda) that dispatches reports from the RRM device daemon 952.

Traditional stats collection agents collect stats on a time interval basis. This can result in wasteful local processing resources and cloud data usage since not all the data is useful all the time. The RRM device daemon 952 can use a concept of adjustable trigger thresholds. This allows only interesting data to be collected and propagate to the RRM cloud daemon 954. For example, recording the signal RSSI every 10 minutes is very wasteful and may even miss important events in the case where the critical event happens in between the sampling interval. Instead of interval sampling, the RRM device daemon 952 can listen to triggers. For example, the RRM device daemon 952 can listen for triggers such that when the current RSSI level spikes or drops by 10 dB; only then, would the RRM device daemon 952 record the event and propagate to the RRM cloud daemon 954. This ensures that not only important events are recorded to save storage and cloud data cost, but that no important events are missed.

The RRM device daemon 952 can also use a calendar system. The calendar system can ensure that the statistics collection agents do not collect the wrong data during timers where other critical events are occurring. For example, without the calendar system, the congestion collection agent may be collecting data when the channel scan agent is scanning on an off-channel. If the congestion collection agent is unaware of the channel change, congestion collection agent can report the wrong congestion data for the wrong channel. The calendar system ensures that the collection agents' channel states are coordinated.

As noted above, the RRM cloud daemon 954 and RRM device daemon 956 use a fully extensible design model where the cloud stats agent mirrors the device stats agent in a 1-to-1 mapping to allow new modules to be easily plugged-in or swapped-out in real-time without impacting the existing infrastructure. The stats agents can input the reports into one or more databases (e.g., DynamoDB). The RRM cloud daemon 954 can also provide a front-end dashboard to the data in the database(s). The RRM cloud daemon 954 can also include RRM business logic that can access the data in the database(s) for RRM cloud operations, as described herein. The RRM business logic can perform multiple computing jobs. These computing jobs can be implemented using AWS Batch, for example.

As set forth herein, the RRM architecture and algorithms on the devices and on the cloud can provide a centralized RRM (e.g., a cloud-based RRM) that is highly extensible to a mix of wired and wireless networking topologies. Cloud-based RRM can adapt each network dynamically to operate efficiently for the targeted applications. On the device agent, one or more methods can efficiently collect device metrics with minimal computation and bandwidth requirements. One or more databases can be used to handle time-series and dynamic device configurations. This layered approach allows for scalability. The layered approach can also provide network optimization, data visualization, and network operations to monitor the health of the network. The metric and data collected from the network can be machine learnt to predict bandwidth and traffic provisioning and providing a targeted SLA for the end customer. For the cloud-based RRM, the network optimizer can also offer a modular and efficient way to determine the optimal operating scenarios for the connected devices, as well as methods to schedule and reliably apply the operating parameters to the devices in a coordinate way.

Figure 10:
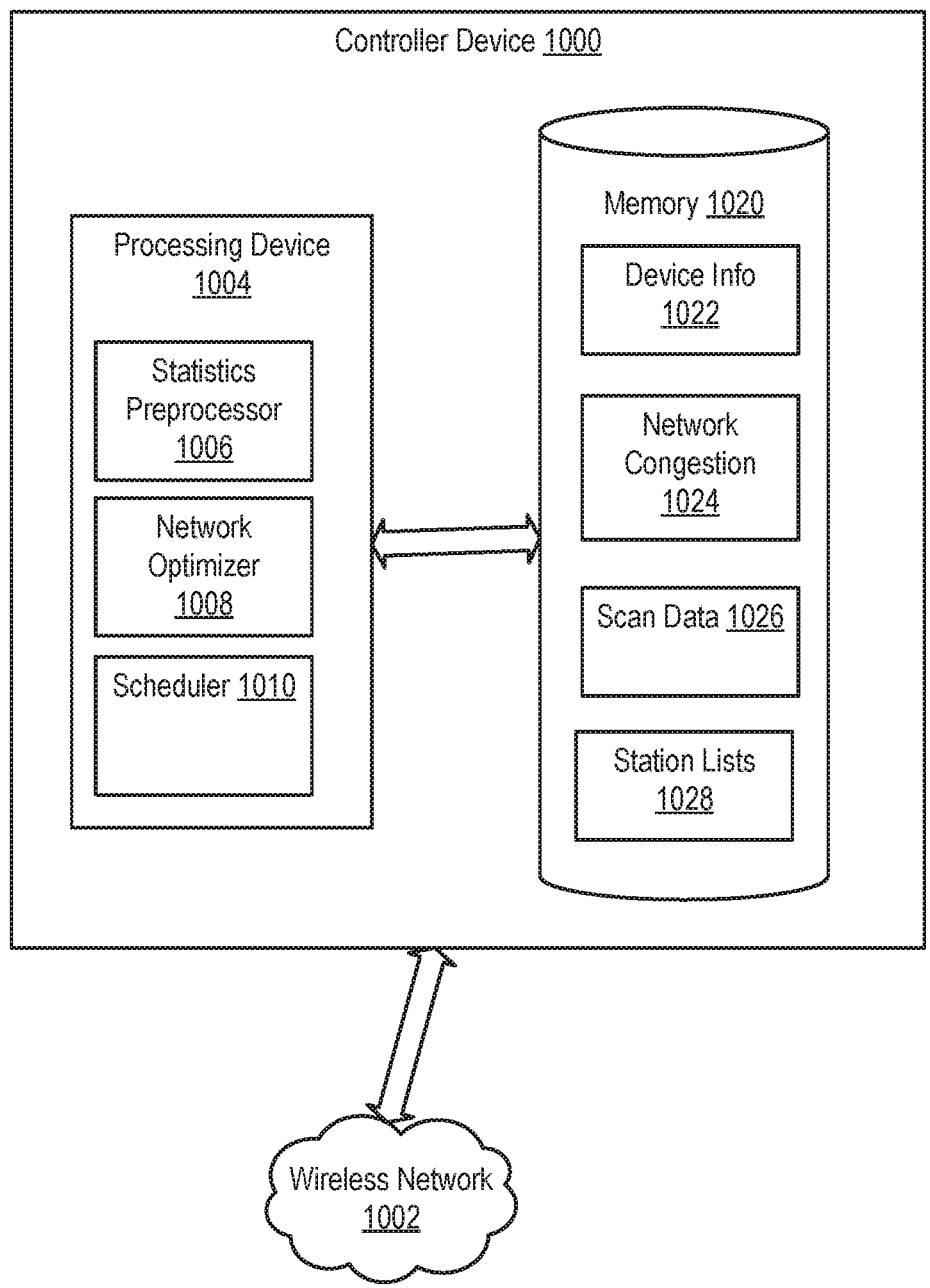
FIG. 10 is a block diagram of a controller device communicatively coupled to mesh network device of a wireless mesh network according to one embodiment.

FIG. 10 is a block diagram of a controller device 1000 communicatively coupled to mesh network device of a wireless mesh network 1002 according to one embodiment. The controller device 1000 includes a processing device 1004 and a memory device 1020 operatively coupled to the processing device 1004. The memory device 1020 can store one or more time-series database tables. The controller device 1000 can receive data from the mesh network devices of the wireless mesh network 1002. For example, the mesh network device can report device information 1022 about each of the mesh network devices, network congestion data 1024 at each of the mesh network devices, scan data 1026 that identifies peers of each of the mesh network devices, and station list data 1028 that identifies clients of each of the mesh network devices. The controller device 1000 can store the reported data in the memory device 1020. It should be noted that the controller device 1000 can include more than one processing device and more than one memory devices 1020.

The processing device 1004 can execute various software components for various functionality. In the depicted embodiment, the processing device 1004 executes a statistics preprocessor 1006, a network optimizer 1008, and a scheduler 1010. The statistics preprocessor 1006 can determine an average radio-to-radio receive signal strength indicator (RSSI) value for each of the mesh network devices across a specified time range included in the device metric reported by the mesh network devices of the wireless mess network 1002. The statistics preprocessor 1006 can generate a peer RSSI matrix with the average radio-to-radio RSSI values. The peer RSSI matrix can be stored in memory 1020. The statistics preprocessor 1006 can determine an average channel measurement for each of the mesh network devices across the specified time range included in the device metrics. The statistics preprocessor can generate a channel measurements matrix with the average channel measurements. The channel measurements matrix can be stored in memory 1020. The network optimizer 1008 can identify one or more radio clusters. For example, the network optimizer 1008 can identify a first radio cluster by applying a peer threshold against the average radio-to-radio RSSI values of the peer RSSI matrix. The network optimizer 1008 can identify a second radio cluster in a similar manner. The network optimizer 1008 can assign a channel to each radio of the first radio cluster using a minimum weight matching algorithm. The network optimizer 1008 can assign a channel to each radio of the second radio cluster using the minimum weight matching algorithm. The minimum weight matching algorithm selects channel assignments in view of the channel load that minimizes a total minimum cost (e.g., cost function is channel load based on the existing traffic data) for the entire wireless mesh network or for the cluster of mesh network devices. The network optimizer 1008 [[can]] generates a channel assignment list with the channels assigned by the network optimizer and sends the channel assignment list to the scheduler 1010. The scheduler 1010 can group the mesh network devices into one or more groups according to type of access point. For example, the scheduler 1010 can group the mesh network device into a first group of one or more base station node access points (BSN APs), a second group of one or more relay node access points (RLN APs), and a third group of one or more home access node access points (HAN AP). The scheduler 1010 can extract from the channel assignment list a first new channel subvectors (also referred to as a channel assignment sublist or subset) for the first group, a second new channel subvector for the second group, and a third new channel subvector for the third group. The scheduler 1010 can apply the first new channel subvector to the first group. The scheduler 1010 can confirm that the first group has changed to the new channels before applying the second new channel subvectors to the second group. For example, the scheduler 1010 can confirm that all client radios of the BSN APs have changed to the first new channel subvector. The scheduler 1010 can apply the second new channel subvector to the second group. The scheduler 1010 can confirm that that the second group has changed to the new channels before applying the third new channel subvectors to the third group. For example, the scheduler 1010 can confirm that all client radios of the RLN APs have changed to the second new channel subvector. The scheduler 1010 can apply the third new channel subvector to the second group. The scheduler 1010 can confirm that the third group has changed to the new channels. For example, the scheduler 1010 can confirm that all client radios of the HAN APs have changed to the third new channel subvector.

In another embodiment, at least one of the mesh network devices of the wireless mesh network 1002 is a BSN AP and at least one of the mesh network devices is a HAN AP. each mesh network device is configured to report device information, network congestion data at the respective device; scan data, and a station list. The controller device can be a server. The server can assign a channel to each radio of the mesh network devices using the device information, the network congestion data, the scan data, and the station list received from each of the mesh network devices. The server can send a first subset of channel assignments to the BSN AP and send a second subset of channel assignments to the HAN AP after the first subset of channel assignments is sent to the BSN AP. In a further embodiment, at least one of the mesh network devices is a RLN AP and the server can send a third subset of channel assignments to the RLN AP after the first subset of channel assignments is sent to the BSN AP and before the second subset of channel assignments is sent to the HAN AP.

In a further embodiment, to assign the channel to each radio of the mesh network devices, the server can determine an average radio-to-radio RSSI value for each of the mesh network devices across a specified time range and generate a peer RSSI matrix with the average radio-to-radio RSSI values. The server can determine an average channel measurement for each of the mesh network devices across the specified time range and generate a channel measurements matrix with the average channel measurements. The server can identify a first radio cluster and a second radio cluster by comparing the average radio-to-radio RSSI values of the peer RSSI matrix against a threshold. The server assigns a channel to each radio of the first radio cluster using a minimum weight matching algorithm. The server assigns a channel to each radio of the second radio cluster using the minimum weight matching algorithm.

Figure 11:
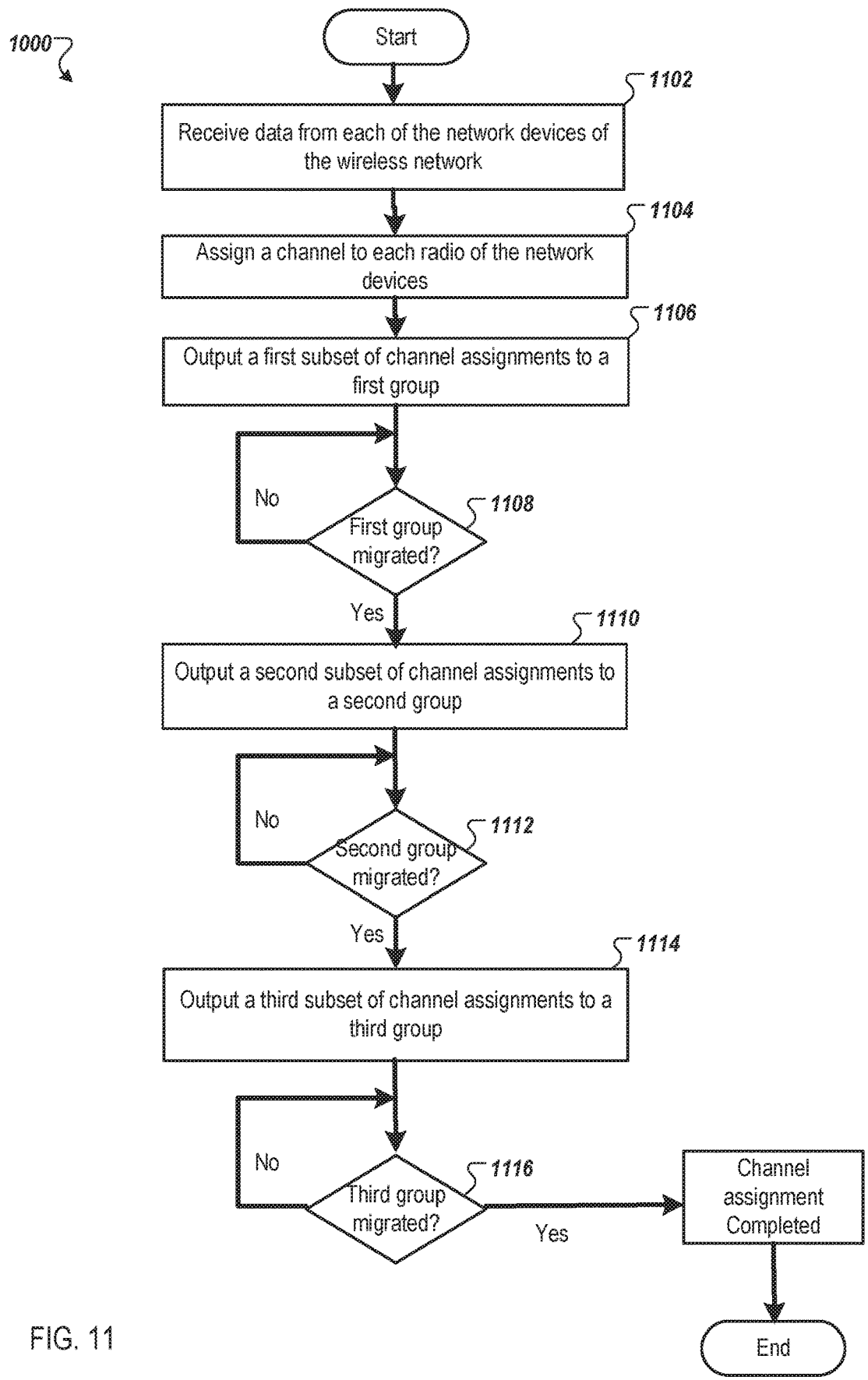
FIG. 11 is a flow diagram illustrating a method of assigning channels to mesh network devices of a wireless mesh network according to another embodiment.

FIG. 11 is a flow diagram illustrating a method 1100 of assigning channels to mesh network devices of a wireless mesh network according to another embodiment. The method 1100 may be performed by processing logic that comprises hardware (e.g., circuitry, dedicated logic, programmable logic, microcode, etc.), software, firmware, or a combination thereof. In one embodiment, the method 1100 may be performed by any of the mesh network devices described herein and illustrated with respect to FIGS. 1-10.

Referring to FIG. 11, the method 1100 begins by the processing receiving from mesh network devices of a wireless mesh network, device information about each of the mesh network devices, network congestion data at each of the mesh network devices, scan data that identifies peers of each of the mesh network devices, and a station list that identifies clients of each of the mesh network devices (block 1102). The processing logic assigns a channel to each radio of the mesh network devices using the device information, the network congestion data, the scan data, and the station list (block 1104). The processing logic outputs a first subset of channel assignments to a first group of the mesh network devices (block 1106). The processing logic confirms whether the first group has changed to the first subset of channel assignments (block 1108). Once the processing logic confirms the first group has changed, the processing logic outputs a second subset of channel assignments to a second group of the mesh network devices (block 1110). The processing logic confirms whether the second group has changed to the second subset of channels (block 1112). Once the processing logic confirms the second group has changed, the processing logic outputs a third subset of channel assignments to a third group of the mesh network devices (block 1114). In a further embodiment, the processing logic can optionally confirm whether the third group has changed to the third subset of channels (block 1116). Once the processing logic confirms the third group has changed, the processing logic can output that the new channel assignments have been completed (block 1118), and the method 1100 ends.

In one embodiment, the first group includes one or more BSN APs, the second group includes one or more RLN APs, and the third group includes one or more HAN APs. In a further embodiment, the processing logic receives, from the mesh network devices, updated device information about each of the mesh network devices, updated network congestion data at each of the mesh network devices, updated scan data that identifies peers of each of the mesh network devices, and an updated list that identifies clients of each of the mesh network devices. The processing logic can use the updated data to confirm that the first group, the second group, and the third group have changed.

In one embodiment, the processing logic at block 1104 determines from the scan data, an average radio-to-radio RSSI value for each of the mesh network devices across a specified time range and generates a peer RSSI matrix with the average radio-to-radio RSSI values. The processing logic can determine, from the network congestion data, an average channel measurement for each of the mesh network devices across the specified time range and generate a channel measurements matrix with the average channel measurements.

In a further embodiment, the processing logic identifies a first radio cluster and a second radio cluster by comparing the average radio-to-radio RSSI values of the peer RSSI matrix against a threshold. The processing logic can identify more clusters than two. The processing logic assigns a channel to each radio of the first radio cluster using a minimum weight matching algorithm. Then, the processing logic assigns a channel to each radio of the second radio cluster using the minimum weight matching algorithm. The processing logic can continue this for as many radio clusters are identified.

In a further embodiment, the processing logic generates a channel assignment list with the channels assigned to the radios of the first radio cluster and the second radio cluster. The processing logic groups the mesh network devices into the first group, the second group, and the third group according to a device type. The processing logic extracts the first subset of channel assignments from the channel assignment list and outputs the first subset of channel assignments to the first group. The processing logic confirms that all client radios of the first group have changed to the first subset of channel assignments. The processing logic extracts the second subset of channel assignments from the channel assignment list and outputs the second subset of channel assignments to the second group. The processing logic confirms that all client radios of the second group have changed to the second subset of channel assignments. The processing logic extracts the third subset of channel assignments from the channel assignment list and outputs the third subset of channel assignments to the third group. In one embodiment, the first group includes one or more BSN APs, the second group includes one or more RLN APs, and the third group includes one or more HAN APS.

In another embodiment, the processing logic at block 1104 stores the device information received at block 1102, including storing the device information, the network congestion data, the scan data, and the station list in time-series database tables. The processing logic determines, by a statistics preprocessor executed by the controller device, a set of time-series statistics per device for each of the mesh network devices. As part of determining the set of time-series statistics per device, the processing logic can determine a first average channel load per a first time period and a second average channel load per a second time period. The processing logic can also determine a third average channel load for more than two time periods. The set of time-series statistics can include one or more of the following: radio clustering statistics; airtime per device; airtime per cluster; airtime per network; link budget; peer RSSI per network; frame latency per device; channel load per device; channel load per radio cluster; channel load per network; packet error rate (PER); or frame error rate (FER).

In another embodiment, the processing logic generates a peer list that includes associated stations for each AP or associated APs for each station.

In another embodiment, the processing logic at block 1104 generates a peer RSSI matrix, the peer RSSI matrix include an average radio-to-radio RSSI value for each of the mesh network devices across a specified time range. The processing logic also generates a channel measurements matrix, the channel measurements matrix including an average channel measurement for each of the mesh network devices across the specified time range. The processing logic assigns, by a network optimizer executed by the controller device, the channel to each radio of the mesh network devices using the peer RSSI matrix and the channel measurements matrix. In a further embodiment, the processing logic at block 1104 extracts the average channel measurement for a radio cluster of mesh network devices and assigns the channel to each radio of the radio cluster using a minimum weight matching algorithm.

In some embodiments, the controller device is a server, such a cluster server, a cloud server, or a cloud service implemented by one or more computing systems. In other embodiments, the controller device is a device in the wireless mesh network, such as one of the mesh network devices. That is, one of the mesh network devices can be designated as handling the controller device functionality described herein.

Figure 12:
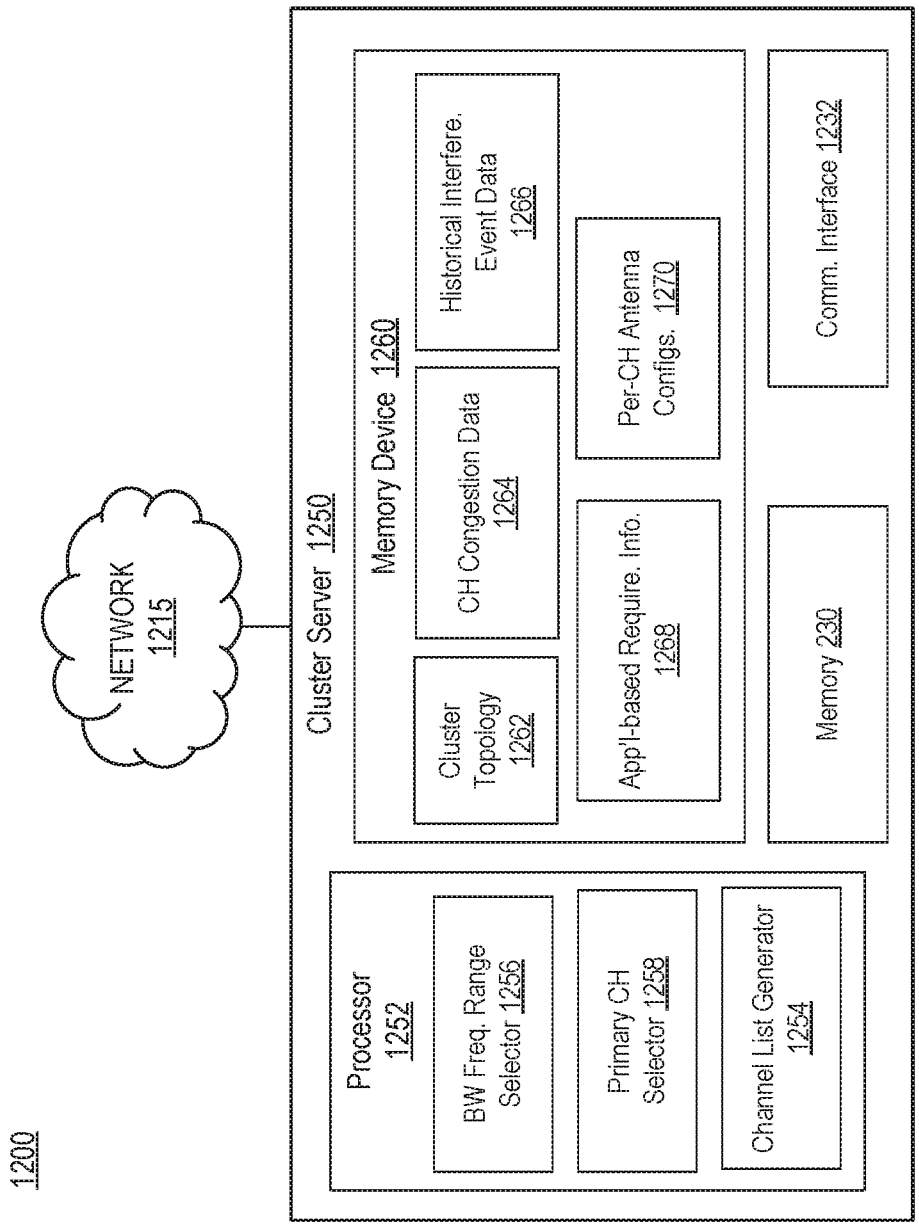
FIG. 12 is a block diagram of a cluster server for coordinated channel assignment for a wireless mesh network according to one embodiment.

FIG. 12 is a block diagram of a cluster server 1250 for coordinated channel assignment for a wireless mesh network 1200 according to one embodiment. The cluster server 250 can be a remote server, a cloud computing device such as a cloud server, or a cloud service implemented by one or more servers. The mesh network devices of the wireless mesh network 1200 can communicate with the cluster server 1250 via a network 1215. In various embodiments, the cluster server 1250 may include memory 1230, a communication interface 1232, a processor 1252, and a memory device 1260. The communication interface 1232, which may include one or more network devices for connecting to the Internet, may be adapted to also wirelessly couple the cluster server 1250 to the mesh network devices and to communicate data with the mesh network devices as described herein. The data received from the mesh network devices may include, for example, cluster topology information, such as node location, historical interference event data (e.g., which mesh network devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple mesh network devices communicate. The received data may further include information associated with, or useable to determine, pattern recognition and learning associated with radar event detection, data bandwidth requirements, and latency requirements, and the like.

In embodiments, the memory device 1260 includes data stored, which are related to channels of the mesh network devices and associated with cluster topology information 1262 of the WMN, channel congestion data 1264, historical interference event data 1266, historical application-based requirements information 1268 (e.g., historical application-based throughput and latency requirements), and per-channel antenna configurations 1269. The network 215 may be representative of an Internet or WAN connection. Such an Internet or WAN connection may include additional links or trunks, whether wired or wireless, that may involve other types of wideband communication, including those based on cellular standard(s).

In various embodiments, the processor 1252 (e.g., processing device) includes a bandwidth frequency range selector 2156, which is to develop a bandwidth selection priority list for the various mesh network devices, a primary channel selector 1258, which is to develop a primary channel priority list for the various mesh network devices, and a channel list generator 1254, which is to help the mesh network device perform discovery scans, etc. The channel list generator 1254 can also implement the various operations described herein, including the method 1100 of FIG. 11. The bandwidth frequency range selector 1256 may develop the bandwidth selection priority list based on the data stored in the memory device 1260, and particularly in coordinating bandwidth range priorities to coincide with channels that may have higher application service level requirements of throughput or lower application service level requirements for latency. In one example, therefore, widths of the communication link bandwidth may be prioritized to include channels that historically serve streaming media such as serving Echo® devices or AIV client devices. The priorities of the bandwidth ranges within the bandwidth selection priority list may also be set in a way that coordinates with preserving the highest prioritized primary channels within the primary channel priority list for adjacent (or nearby) mesh network devices.

Furthermore, the primary channel selector 1258 may develop the primary channel priority list based on the data stored in the memory device 1260, and particularly in view of the cluster topology information 1262, the channel congestion data 1264, and the historical interference event data 1266. Use of this information will allow the primary channel selector 1258 to prioritize channels as primary channels that have fewer numbers of historical interference detections, that historically have less channel congestion, and/or that coincide with priorities developed for channels of an adjacent mesh network device. The primary channel selector 1258 can also implement the operations described herein, including the operations of method 1100 of FIG. 11.

Figure 13:
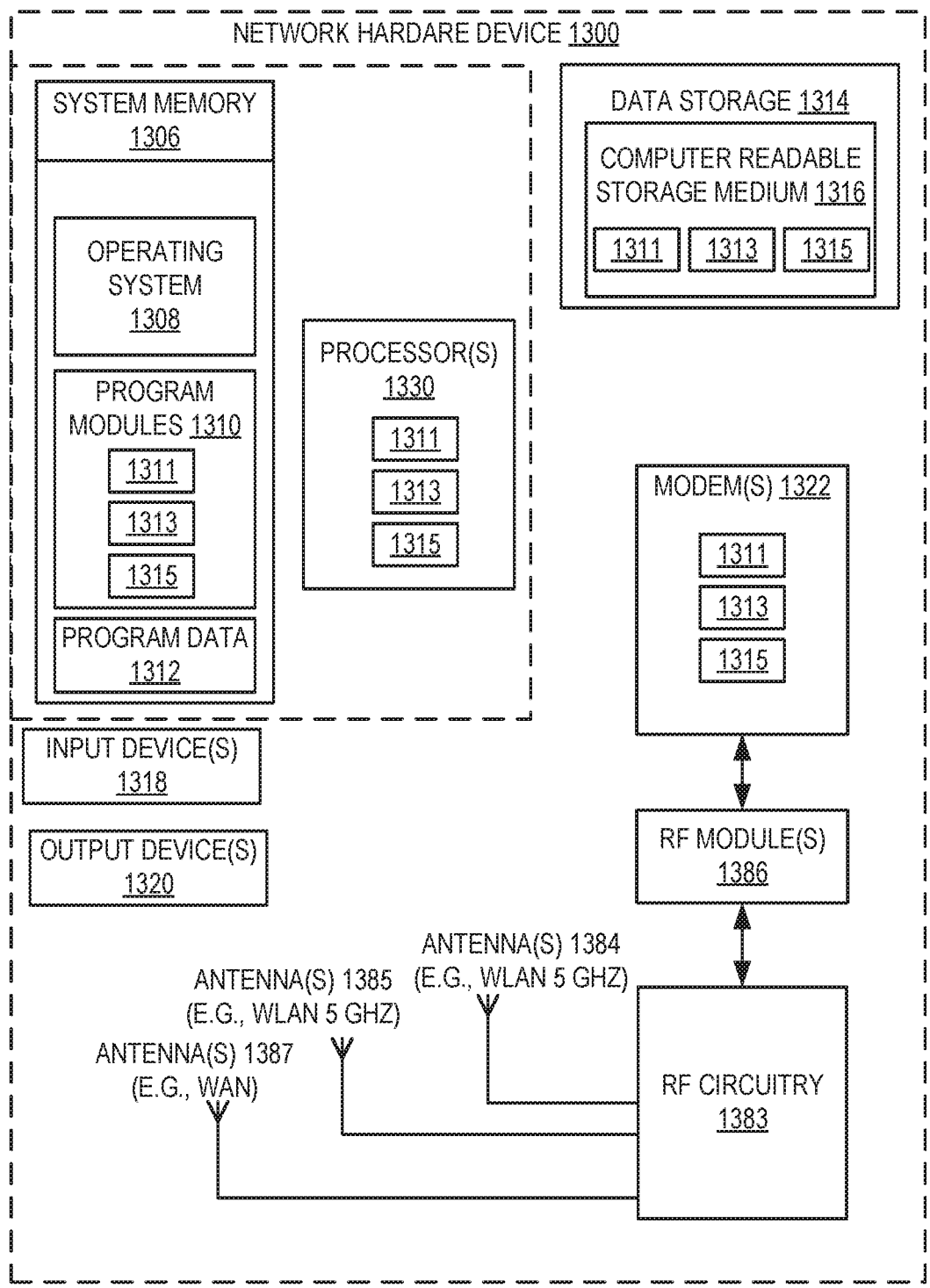
FIG. 13 is a block diagram of a network hardware device according to one embodiment.

FIG. 13 is a block diagram of a network hardware device 1300 according to one embodiment. The network hardware device 1300 may correspond to the mesh network devices described above with respect to FIGS. 1-12. Alternatively, the network hardware device 1300 may be other electronic devices, as described herein.

The network hardware device 1300 includes one or more processor(s) 1330, such as one or more CPUs, microcontrollers, field programmable gate arrays, or other types of processors. The network hardware device 1300 also includes system memory 1306, which may correspond to any combination of volatile and/or non-volatile storage mechanisms. The system memory 1306 stores information that provides operating system component 1308, various program modules 1310, program data 1312, and/or other components. In one embodiment, the system memory 1306 stores instructions of methods to control operation of the network hardware device 1300. The network hardware device 1300 performs functions by using the processor(s) 1330 to execute instructions provided by the system memory 1306. In one embodiment, the program modules 1310 may include a neighbor discovery module 1311, a neighbor peering module 1313, and a re-peering module 1315. The neighbor discovery module 1311 may perform some of the operations of the neighbor discovery process described herein. The neighbor peering module 1313 may perform other operations of the neighbor discovery process described herein. The re-peering module 1315 may perform operations described above when a radar event occurs and the mesh network devices switch to the fallback channel as described herein. Alternatively, the modules 1311-1315 may be implemented in a single module or multiple modules.

The network hardware device 1300 also includes a data storage device 1314 that may be composed of one or more types of removable storage and/or one or more types of non-removable storage. The data storage device 1314 includes a computer-readable storage medium 1316 on which is stored one or more sets of instructions embodying any of the methodologies or functions described herein. Instructions for the program modules 1310 (e.g., 1311, 1313, 1315) may reside, completely or at least partially, within the computer-readable storage medium 1316, system memory 1306 and/or within the processor(s) 1330 during execution thereof by the network hardware device 1300, the system memory 1306 and the processor(s) 1330 also constituting computer-readable media. The network hardware device 1300 may also include one or more input devices 1318 (keyboard, mouse device, specialized selection keys, etc.) and one or more output devices 1320 (displays, printers, audio output mechanisms, etc.).

The network hardware device 1300 further includes a modem 1322 to allow the network hardware device 1300 to communicate via a wireless connections (e.g., such as provided by the wireless communication system) with other computing devices, such as remote computers, an item providing system, and so forth. The modem 1322 can be connected to one or more RF modules 1386. The RF modules 1386 may be a WLAN module, a WAN module, PAN module, GPS module, or the like. The antenna structures (antenna(s) 1384, 1385, 1387) are coupled to the RF circuitry 1383, which is coupled to the modem 1322. The RF circuitry 1383 may include radio front-end circuitry, antenna switching circuitry, impedance matching circuitry, or the like. The antennas 1384 may be GPS antennas, NFC antennas, other WAN antennas, WLAN or PAN antennas, or the like. The modem 1322 allows the network hardware device 1300 to handle both voice and non-voice communications (such as communications for text messages, multimedia messages, media downloads, web browsing, etc.) with a wireless communication system. The modem 1322 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1322 may generate signals and send these signals to antenna(s) 1384 of a first type (e.g., WLAN 5 GHz), antenna(s) 1385 of a second type (e.g., WLAN 2.4 GHz), and/or antenna(s) 1387 of a third type (e.g., WAN), via RF circuitry 1383, and RF module(s) 1386 as descried herein. Antennas 1384, 1385, 1387 may be configured to transmit in different frequency bands and/or using different wireless communication protocols. The antennas 1384, 1385, 1387 may be directional, omnidirectional, or non-directional antennas. In addition to sending data, antennas 1384, 1385, 1387 may also receive data, which is sent to appropriate RF modules connected to the antennas. One of the antennas 1384, 1385, 1387 may be any combination of the antenna structures described herein.

In one embodiment, the network hardware device 1300 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1322 is shown to control transmission and reception via antenna (1384, 1385, 1387), the network hardware device 1300 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by a controller device from a plurality of network devices of a wireless network, device information about each of the plurality of network devices, network congestion data at each of the plurality of network devices, scan data that identifies each radio of each network device of the plurality of network devices, and a station list that identifies a least one client device associated with at least one of the plurality of network devices;
   generating, by the controller device, channel assignment information that includes a list of channels, wherein each channel from the list of channels is associated with at least one radio of each of the plurality of network devices, and wherein the list is generated using the device information, the network congestion data, the scan data, and the station list;
   sending, by the controller device, a first subset of the channel assignment information to each network device of a first group of network devices of the plurality of network devices;
   receiving, from one or more of the network devices of the first group, information that confirms that the client devices, associated with any of the network devices of the first group, have changed to the first subset of the channel assignment information; and
   sending, by the controller device, a second subset of the channel assignment information to each network device of a second group of network devices of the plurality of network devices in response to the receiving the information.

2. The method of claim 1, further comprising:
   receiving, by the controller device from the plurality of network devices, updated device information about each of the plurality of network devices, updated network congestion data at each of the plurality of network devices, updated scan data that identifies each radio of other network devices of the plurality of network devices, and an updated station list that identifies a least one client device associated with at least one of the plurality of network devices;

receiving, from one or more of the network devices of the second group, second information that confirms that the client devices, associated with any of the network devices of the second group, have changed to the second subset of the channel assignment information; and sending, by the controller device, a third subset of the channel assignment information to each network device of a third group network devices of the plurality of network devices in response to the receiving the second information.

3. The method of claim 2, wherein the first group comprises a base station node access point (BSN AP), wherein the second group comprises a relay node access point (RLN AP), and wherein the third group comprises a home access node access point (HAN AP).

4. The method of claim 1, wherein the generating the channel assignment information comprises:
determining, from the scan data, an average radio-to-radio receive signal strength indicator (RSSI) value for each of the plurality of network devices across a specified time range, the average radio-to-radio RSSI value indicating a signal strength between a radio of a first network device and a radio of a second network device;
determining, from the network congestion data, an average channel measurement for each of the plurality of network devices across the specified time range;
identifying a first radio cluster and a second radio cluster by identifying radios having the average radio-to-radio RSSI values exceeding a threshold value; and
assigning a channel to each radio of the first radio cluster and each radio of the second radio cluster using a minimum weight matching algorithm.

5. The method of claim 4, wherein generating the channel assignment information further comprises generating the list of channels with each of the channels assigned to each of the radios of the first radio cluster and the second radio cluster.

6. The method of claim 5, further comprising identifying all client devices associated with any one of the network devices of the first group.

7. The method of claim 6, further comprising identifying all client devices associated with any one of the network devices of the second group.

8. The method of claim 1, wherein the first group comprises one or more base station node access points (BSN APs), wherein the second group comprises one or more home access node access points (HAN AP).

9. The method of claim 1, wherein the generating the channel assignment information comprises:
storing the device information, the network congestion data, the scan data, and the station list in time-series database tables; and
determining, by the controller device, a set of time-series statistics per device for each of the plurality of network devices.

10. The method of claim 9, wherein the determining the set of time-series statistics per device comprises determining a first average channel load per a first time period and a second average channel load per a second time period.

11. The method of claim 9, wherein the set of time-series statistics comprises at least one of:
radio clustering statistics;
airtime statistics per device;
first congestion statistics per cluster, the first congestion statistics derived from a respective node's airtime per cluster;
second congestion statistics per network, the second congestion statistics derived from a respective node's airtime per network;
third congestion statistics derived from a respective radio link budget;
airtime required for a peer receive signal strength indicator (RSSI) per network;
signal strength between two node's frame latency per device;
average delay between frames from the a device channel load per device;
channel load per device;
channel load per radio cluster;
channel load per network;
packet error rate (PER); or
frame error rate (FER).

12. The method of claim 9, further comprising generating a peer list comprises associated client stations for each access point (AP) or associated APs for each base station.

13. The method of claim 1, wherein the generating the channel assignment information comprises:
storing the device information, the network congestion data, the scan data, and the station list in time-series database tables;
generating, by the controller device, a peer RSSI matrix, the peer RSSI matrix comprising an average radio-to-radio receive signal strength indicator (RSSI) value for each of the plurality of network devices across a specified time range;
determining an average channel measurement value for each of the plurality of network devices across the specified time range; and
assigning, by a network optimizer executed by the controller device, the channel to each radio of the plurality of network devices using the peer RSSI matrix and the average channel measurement values.

14. The method of claim 13, wherein the generating the channel assignment information further comprises assigning, by the controller device, the channel to each radio of a radio cluster using a minimum weight matching algorithm.

15. The method of claim 1, wherein the plurality of network devices are mesh network devices that are part of a wireless mesh network, and wherein the controller device is one of the mesh network devices that is part of the wireless mesh network.

16. A system comprising:
a server; and
a wireless network of a plurality of network devices communicatively coupled to the server, wherein at least one of the plurality of network devices is a base station node access point (BSN AP) and at least one of the plurality of network devices is a home access node access point (HAN AP), wherein the plurality of network devices are configured to each report device information, network congestion data at the respective device, scan data, and a station list that identifies at least one client device associated with at least one of the plurality of network devices, wherein the server is to:
generate channel assignment information that includes a list of channels, wherein each channel from the list of channels is associated with at least one radio of each of the plurality of network devices, and wherein the list if generated using the device information, the network congestion data, the scan data, and the station list received from each of the plurality of network devices;

send a first subset of the channel assignment information to the BSN AP;
receive, from the BSN AP, information that confirms that client devices, associated with the BSN AP, have changed to the first subset of the channel assignment information; and
send a second subset of the channel assignment information to the HAN AP after the receiving the information.

17. The system of claim 16, wherein at least one of the plurality of network devices is a relay node access point (RLN AP), and wherein the server is further to:
send a third subset of the channel assignment information to the RLN AP before the second subset is sent to the HAN AP; and
receive, from the BSN AP before the second subset is sent to the HAN AP, second information that confirms that client devices, associated with the RLN AP, have changed to the third subset of the channel assignment information, wherein the second subset of the channel assignment information is sent to the HAN AP responsive to the receiving the second information.

18. The system of claim 16, wherein the server, to generate the channel assignment information, is to:
determine an average radio-to-radio receive signal strength indicator (RSSI) value for each of the plurality of network devices across a specified time range, the average radio-to-radio RSSI value indicating a signal strength between a radio of a first network device and a radio of a second network device;
determine an average channel measurement for each of the plurality of network devices across the specified time range;
identify a first radio cluster and a second radio cluster by identifying radios having the average radio-to-radio RSSI values exceeding a threshold; and
assign a channel to each radio of the first radio cluster and each radio of the second radio cluster using a minimum weight matching algorithm.

19. The method of claim 1, further comprising:
determining, from device metrics in a time-series database, an average radio-to-radio receive signal strength indicator (RSSI) value for each of the plurality of network devices across a specified time range included in the device metrics, wherein average the radio-to-radio RSSI value indicates a signal strength between a radio of a first network device and a radio of a second network device;
generating a peer RSSI matrix with the average radio-to-radio RSSI values, wherein each element of the peer RSSI matrix comprises an RSSI value that is measured at a respective radio of the first network device and is indicative of a signal strength of a respective link between the respective radio of the first network device and a radio of a peer network device of the plurality of network devices;
determining an average channel utilization metric of each channel for each of the plurality of network devices across the specified time range, wherein the average channel utilization metric indicates a channel load for the respective channel;
generating a channel measurements matrix with the average channel utilization metrics, wherein element of the channel measurements matrix comprises the average channel utilization metric measured at the first network device and is indicative of channel quality of a channel of a respective radio of the first network device; and
identifying at least a first radio cluster of the plurality of network devices and a second radio cluster of the plurality of network devices, wherein each of the network devices in the first and the second radio clusters comprise a radio-to-radio RSSI value that exceeds a threshold value, and wherein generating the channel assignment information comprises assigning a channel to each radio of the network devices in the first and the second radio clusters using a minimum weight matching algorithm, wherein the minimum weight matching algorithm selects a channel having a lowest channel load between each of the radios of the network devices in the first and the second radio clusters.

20. The method of claim 19, further comprising:
grouping the plurality of network devices into i) a first group of one or more base station node access points (BSN APs), ii) a second group of one or more relay node access points (RLN APs), and iii) a third group of one or more home access node access points (HAN APs);
generating the first subset of the channel assignment information for the first group of BSN APs, the second subset of the channel assignment information for the second group of RLN APs, and a third subset of the channel assignment information for the third group of HAN APs, wherein sending the first subset to each network device of the first group of BSN APs causes channels to be assigned to the first group of BSN APs according to the first subset, wherein sending the second subset to each network device of the second group of RLN APs according to the second subset;
confirming that all client radios of the second group of RLN APs have changed to the second subset of the channel assignment information; and
receiving second information that confirms that the client devices, associated with any of the network devices of the second group of RLN APs, have changed to the second subset of the channel assignment information; and
sending a third subset of the channel assignment information to each network device of the third group of HAN APs in response to the receiving the second information.

* * * * *